(12) United States Patent
Delvaux et al.

(10) Patent No.: US 6,851,046 B1
(45) Date of Patent: Feb. 1, 2005

(54) JUMPING TO A RECOMBINE TARGET ADDRESS WHICH IS ENCODED IN A TERNARY BRANCH INSTRUCTION

(75) Inventors: Marc R. Delvaux, Metuchen, NJ (US); Mazhar Alidina, Hillsborough, NJ (US)

(73) Assignee: GlobeSpanVirata, Inc., Red Bank, NJ (US)

( * ) Notice: Subject to any disclaimer, the term of this patent is extended or adjusted under 35 U.S.C. 154(b) by 632 days.

(21) Appl. No.: 10/011,183

(22) Filed: Nov. 13, 2001

Related U.S. Application Data

(60) Provisional application No. 60/248,424, filed on Nov. 14, 2000.

(51) Int. Cl.[7] .................................................. G06F 9/42
(52) U.S. Cl. ...................................... 712/236; 712/209
(58) Field of Search ........................ 712/233–241, 712/209

(56) References Cited

U.S. PATENT DOCUMENTS

| | | | |
|---|---|---|---|
| 3,979,725 A | 9/1976 | Disparte et al. | |
| 4,338,661 A | 7/1982 | Tredennick et al. | |
| 4,373,180 A | 2/1983 | Linde | |
| 4,446,518 A | 5/1984 | Casamatta | |
| 4,868,469 A | 9/1989 | Chan | |
| 4,907,192 A | 3/1990 | Kaneko | |
| 5,203,006 A | 4/1993 | Taniai | |
| 5,210,833 A | 5/1993 | Kaneko | |
| 5,388,236 A | 2/1995 | Murakami et al. | |
| 5,732,252 A | 3/1998 | Wilson | |
| 5,794,026 A | 8/1998 | Hervin et al. | |
| 5,815,697 A | 9/1998 | Bosshart et al. | |
| 5,872,965 A | 2/1999 | Petrick | |
| 6,112,299 A | * 8/2000 | Ebcioglu et al. | ............ 712/236 |
| 6,112,300 A | 8/2000 | Cook et al. | |

* cited by examiner

*Primary Examiner*—Eddie Chan
*Assistant Examiner*—Tonia L. Meonske
(74) *Attorney, Agent, or Firm*—Thomas, Kayden, Horstemeyer, & Risley

(57) ABSTRACT

A system and method for performing a general ternary branch instruction is provided. Additionally, different approaches are provided for reducing the complexity of a ternary branch instruction word and corresponding hardware.

15 Claims, 28 Drawing Sheets

|  | ABSOLUTE ADDRESS | CONTENTS |
|---|---|---|
| BR3 | 1 000 000 | BR3 (1000002, 1000010, 1000005, 1000013) |
|  | 1 000 001 | NO OPERATION (NOP) |
| CONDITION X | 1 000 002 | INSTRUCTION SET X' AT 1000002 (THREE INSTRUCTIONS) (JUMP TO W' AT 1000013) |
|  | 1 000 003 | |
|  | 1 000 004 | |
| CONDITION Z | 1 000 005 | INSTRUCTION SET Z' AT 1000005 (FIVE INSTRUCTIONS) (JUMP TO W' AT 1000013) |
|  | 1 000 006 | |
|  | 1 000 007 | |
|  | 1 000 008 | |
|  | 1 000 009 | |
| CONDITION Y | 1 000 010 | INSTRUCTION SET Y' AT 1000010 (THREE INSTRUCTIONS) (JUMP TO W' AT 1000013) |
|  | 1 000 011 | |
|  | 1 000 012 | |
| W | 1 000 013 | INSTRUCTION SET W' AT 1000013 |

FIG. 1C

| | ABSOLUTE ADDRESS | CONTENTS |
|---|---|---|
| BR3 | 1 000 000 | BR3 (1000010, 1000004, 1000013) |
| CONDITION X | 1 000 001 | INSTRUCTION SET X' FIXED AFTER BR3 (THREE INSTRUCTIONS) (JUMP TO W' AT 1000013) |
| | 1 000 002 | |
| | 1 000 003 | |
| CONDITION Z | 1 000 004 | INSTRUCTION SET Z' AT 1000004 (SIX INSTRUCTIONS) (JUMP TO W' AT 1000013) |
| | 1 000 005 | |
| | 1 000 006 | |
| | 1 000 007 | |
| | 1 000 008 | |
| | 1 000 009 | |
| CONDITION Y | 1 000 010 | INSTRUCTION SET Y' AT 1000010 (THREE INSTRUCTIONS) (JUMP TO W' AT 1000013) |
| | 1 000 011 | |
| | 1 000 012 | |
| W | 1 000 013 | INSTRUCTION SET W' AT 1000013 |

FIG. 2C

| | ABSOLUTE ADDRESS | RELATIVE ADDRESS OFFSET | CONTENTS |
|---|---|---|---|
| BR3 | 1 000 000 | 0 | BR3 (2, 10, 5, 13) |
| | 1 000 001 | 1 | NOP |
| CONDITION X | 1 000 002 | 2 | INSTRUCTION SET X' AT 0+2 (THREE INSTRUCTIONS) (JUMP TO W' AT 0+13) |
| | 1 000 003 | 3 | |
| | 1 000 004 | 4 | |
| CONDITION Z | 1 000 005 | 5 | INSTRUCTION SET Z' AT 0+5 (FIVE INSTRUCTIONS) (JUMP TO W' AT 0+13) |
| | 1 000 006 | 6 | |
| | 1 000 007 | 7 | |
| | 1 000 008 | 8 | |
| | 1 000 009 | 9 | |
| CONDITION Y | 1 000 010 | 10 | INSTRUCTION SET Y' AT 0+10 (THREE INSTRUCTIONS) (JUMP TO W' AT 0+13) |
| | 1 000 011 | 11 | |
| | 1 000 012 | 12 | |
| W | 1 000 013 | 13 | INSTRUCTION SET W' AT 0+13 |

FIG. 3C

| | ABSOLUTE ADDRESS | OFFSET FROM PRIOR INSTR. SET (LENGTH OF PRIOR INSTR. SET) $([L_{BR,}] L_X, L_Y, L_Z)$ | CONTENTS |
|---|---|---|---|
| BR3 | 1 000 000 | IRRELEVANT | BR3 ([1,] 2, 3, 5) |
| CONDITION X | 1 000 001 | 1 OR DEFAULT | INSTRUCTION SET X' AT BR3+1 (OR IMPLICIT) (TWO INSTRUCTIONS) |
| | 1 000 002 | | (IMPLICIT JUMP TO W') |
| CONDITION Y | 1 000 003 | 2 | INSTRUCTION SET Y' AT X'+2 (THREE INSTRUCTIONS) |
| | 1 000 004 | | |
| | 1 000 005 | | (IMPLICIT JUMP TO W') |
| CONDITION Z | 1 000 006 | 3 | INSTRUCTION SET Z' AT Y'+3 (FIVE INSTRUCTIONS) |
| | 1 000 007 | | |
| | 1 000 008 | | |
| | 1 000 009 | | |
| | 1 000 010 | | (IMPLICIT JUMP TO W') |
| W | 1 000 011 | 5 | INSTRUCTION SET W' AT Z'+5 |

FIG. 4C

| | ABSOLUTE ADDRESS | OFFSET FROM PRIOR INSTR. SET (LENGTH OF PRIOR INSTR. SET) ($L_{FIXED}$) | CONTENTS |
|---|---|---|---|
| BR3 | 1 000 000 | IRRELEVANT | BR3 (5) |
| CONDITION X | 1 000 001 | 1 (DEFAULT) | INSTRUCTION SET X' IMPLICIT AFTER BR3 (TWO INSTRUCTIONS + THREE NOP) |
| | 1 000 002 | | |
| | 1 000 003 | | NOP |
| | 1 000 004 | | NOP |
| | 1 000 005 | | NOP (IMPLICIT JUMP TO W') |
| CONDITION Y | 1 000 006 | 5 | INSTRUCTION SET Y' AT BR3+$L_{FIXED}$ (THREE INSTRUCTIONS + TWO NOP) |
| | 1 000 007 | | |
| | 1 000 008 | | |
| | 1 000 009 | | NOP |
| | 1 000 0010 | | NOP (IMPLICIT JUMP TO W') |
| CONDITION Z | 1 000 011 | 5 | INSTRUCTION SET Z' AT BR3+2$L_{FIXED}$ (FIVE INSTRUCTIONS) |
| | 1 000 012 | | |
| | 1 000 013 | | |
| | 1 000 014 | | |
| | 1 000 015 | | (IMPLICIT JUMP TO W') |
| W | 1 000 016 | 5 | INSTRUCTION SET W' AT BR3+3$L_{FIXED}$ |

FIG. 5C

| | ABSOLUTE ADDRESS | OFFSET FROM PRIOR INSTR. SET (LENGTH OF PRIOR INSTR. SET) $(L_{FIXED}, L_Z)$ | CONTENTS |
|---|---|---|---|
| BR3 | 1 000 000 | IRRELEVANT | BR3 (5, 3) |
| CONDITION X | 1 000 001 | 1 (DEFAULT) | INSTRUCTION SET X' IMPLICIT AFTER BR3 (TWO INSTRUCTIONS + THREE NOP) |
| | 1 000 002 | | |
| | 1 000 003 | | NOP |
| | 1 000 004 | | NOP |
| | 1 000 005 | | (IMPLICIT JUMP TO W') |
| CONDITION Y | 1 000 006 | 5 | INSTRUCTION SET Y' AT BR3+$L_{FIXED}$ (FIVE INSTRUCTIONS) |
| | 1 000 007 | | |
| | 1 000 008 | | |
| | 1 000 009 | | |
| | 1 000 0010 | | (IMPLICIT JUMP TO W') |
| CONDITION Z | 1 000 011 | 5 | INSTRUCTION SET Z' AT BR3+2$L_{FIXED}$ (THREE INSTRUCTIONS) |
| | 1 000 012 | | |
| | 1 000 013 | | (IMPLICIT JUMP TO W') |
| W | 1 000 014 | 3 | INSTRUCTION SET W' AT BR3+2$L_{FIXED}$+$L_Z$ |

FIG. 6C

| | ABSOLUTE ADDRESS | CONTENTS |
|---|---|---|
| BR3 | 1 000 000 | BR3 (4, 2) |
| CONDITION X | 1 000 001 | INSTRUCTION SET X' (0) INTERLEAVED (THREE INSTRUCTIONS + ONE NOP = $L_{FIXED}$) (IMPLICIT JUMP OF +2) |
| CONDITION Y | 1 000 002 | INSTRUCTION SET Y' (0) INTERLEAVED (FOUR INSTRUCTIONS = $L_{FIXED}$) (IMPLICIT JUMP OF +2) |
| | 1 000 003 | INSTRUCTION SET X' (1) (IMPLICIT JUMP OF +2) |
| | 1 000 004 | INSTRUCTION SET Y' (1) (IMPLICIT JUMP OF +2) |
| | 1 000 005 | INSTRUCTION SET X' (2) (IMPLICIT JUMP OF +2) |
| | 1 000 006 | INSTRUCTION SET Y' (2) (IMPLICIT JUMP OF +2) |
| | 1 000 007 | NOP (IMPLICIT JUMP TO W' AT $BR3+2L_{FIXED}+L_Z$) |
| | 1 000 008 | INSTRUCTION SET Y' (3) (IMPLICIT JUMP TO W' AT $BR3+2L_{FIXED}+L_Z$) |
| CONDITION Z | 1 000 009 | INSTRUCTION SET Z' AT $BR3+2L_{FIXED}$ (TWO INSTRUCTIONS) |
| | 1 000 0010 | (IMPLICIT JUMP TO W' AT $BR3+2L_{FIXED}+L_Z$) |
| W | 1 000 011 | INSTRUCTION SET W' AT $BR3+2L_{FIXED}+L_Z$ |

FIG. 7B

| | ABSOLUTE ADDRESS | CONTENTS |
|---|---|---|
| BR3 | 1 000 000 | BR3 (4, 13) |
| CONDITION X | 1 000 001 | INSTRUCTION SET X' (0) INTERLEAVED (THREE INSTRUCTIONS + ONE NOP = $L_{FIXED}$) (IMPLICIT JUMP OF +2) |
| CONDITION Y | 1 000 002 | INSTRUCTION SET Y' (0) INTERLEAVED (FOUR INSTRUCTIONS = $L_{FIXED}$) (IMPLICIT JUMP OF +2) |
| | 1 000 003 | INSTRUCTION SET X' (1) (IMPLICIT JUMP OF +2) |
| | 1 000 004 | INSTRUCTION SET Y' (1) (IMPLICIT JUMP OF +2) |
| | 1 000 005 | INSTRUCTION SET X' (2) (IMPLICIT JUMP OF +2) |
| | 1 000 006 | INSTRUCTION SET Y' (2) (IMPLICIT JUMP OF +2) |
| | 1 000 007 | NOP (IMPLICIT JUMP TO W' AT BR3+$2L_{FIXED}$) |
| | 1 000 008 | INSTRUCTION SET Y' (3) (IMPLICIT JUMP TO W' AT BR3+$2L_{FIXED}$) |
| W | 1 000 009 | INSTRUCTION SET W' AT BR3+$2L_{FIXED}$ |
| | 1 000 0010 | |
| | 1 000 011 | (LESS THAN $Z_{OFF}-2L_{FIXED}$ INSTRUCTIONS) |
| CONDITION Z | 1 000 012 | INSTRUCTION SET Z' AT BR3+13 (IMPLICIT JUMP TO W' AT BR3+$2L_{FIXED}$) |

FIG. 8B

| | ABSOLUTE ADDRESS | OFFSET FROM PRIOR INSTR. SET (LENGTH OF PRIOR INSTR. SET) $(L_{FIXED}, W)$ | CONTENTS |
|---|---|---|---|
| BR3 | 1 000 000 | IRRELEVANT | BR3 (5) |
| CONDITION X | 1 000 001 | 1 (DEFAULT) | INSTRUCTION SET X' IMPLICIT AFTER BR3 (TWO INSTRUCTIONS + THREE NOP) |
| | 1 000 002 | | |
| | 1 000 003 | | NOP |
| | 1 000 004 | | NOP |
| | 1 000 005 | | NOP (IMPLICIT JUMP TO W') |
| CONDITION Y | 1 000 006 | 5 | INSTRUCTION SET Y' AT BR3+$L_{FIXED}$ (THREE INSTRUCTIONS + TWO NOP) |
| | 1 000 007 | | |
| | 1 000 008 | | |
| | 1 000 009 | | NOP |
| | 1 000 0010 | | NOP (IMPLICIT JUMP TO W') |
| CONDITION Z | 1 000 011 | 5 | INSTRUCTION SET Z' AT BR3+2$L_{FIXED}$ (FIVE INSTRUCTIONS) |
| | 1 000 012 | | |
| | 1 000 013 | | |
| | 1 000 014 | | |
| | 1 000 015 | | (IMPLICIT JUMP TO W') |
| W | 1 000 016 | 5 | INSTRUCTION SET W' AT W |

FIG. 10B

JUMPING TO A RECOMBINE TARGET ADDRESS WHICH IS ENCODED IN A TERNARY BRANCH INSTRUCTION

CROSS REFERENCE TO RELATED APPLICATIONS

This application claims the benefit of U.S. Provisional Patent Application No. 60/248,424, dated Nov. 14, 2000, which is incorporated herein by reference in its entirety.

FIELD OF INVENTION

This invention relates generally to computer architecture and computer instruction sets, and more particularly to a system and method for performing ternary branch instructions.

BACKGROUND

Briefly described, a binary tree allows for a two-way divergence from a "branch point." Depending on the output of the evaluated condition, the binary tree follows one of two divergent paths. Unlike binary trees, ternary trees allow for a three-way divergence at a branch point. Ternary trees evaluate a condition for three possible outputs, and, depending on the output of the evaluated condition, the ternary tree follows one of the three divergent paths. Ternary trees have been used for several years to perform searching algorithms because ternary trees are faster than conventional hashing or indexing methods that handle comparable tasks.

Traditionally, in order to perform a general-purpose search, such as a binary or ternary tree, a processor performed two separate tests to determine the "direction" of the search. This is shown in FIG. 11. In the first step 1110, a processor would evaluate between the two conditions A=B (equality condition) and A≠B (inequality condition). From here, if an equality condition is met, then the processor would execute, in step 1140, an instruction set associated with the equality condition. If, on the other hand, the inequality condition A≠B is met, then the processor would evaluate, in step 1150, between the two inequality conditions A<B and A>B. If the A<B condition was met, then the processor would execute, in step 1165, the instruction set associated with that inequality. On the other hand, if the A>B condition was met, then the processor would execute, in step 1175, the instruction set associated with that inequality condition. Once the appropriate instruction set has been executed, the processor, in step 1180, continues with the instructions found at a common address. This two-step process may be simplified by using a ternary branch instruction, which evaluates the three conditions (i.e., A=B, A<B, and A>B) in a single step.

While limited attempts have been made to perform ternary branch instructions, these attempts have failed to truly implement a general ternary branch instruction. Thus, there is a need in the art for a system and method that is capable of performing a general ternary branch instruction.

SUMMARY

The present invention provides a system and method for performing ternary branch instructions.

One embodiment of the invention is a system configured to perform ternary branch instructions. The system comprises a processor having a ternary branch instruction word with four target addresses. Three of the four target addresses are branch target addresses containing branch instruction sets, while the fourth target address is a recombine target address to which the system implicitly jumps after executing the instruction set at one of the branch target addresses. The processor is configured to evaluate a ternary branch condition and, depending on the result of the evaluation, select one of the three branch target addresses containing branch instructions. Upon selecting one of the three branch addresses, the processor is configured to jump to the selected branch address and execute the instruction set at the selected branch address. After executing the instruction set at the selected branch address, the processor is configured to implicitly jump to the recombine target address, which contains additional instructions for the processor.

In accordance with another aspect of the present invention, a method is provided for performing ternary branch instructions. In one embodiment, the method comprises the steps of receiving a ternary branch instruction word having four target addresses, evaluating a branch condition in response to receiving the ternary branch instruction word, and selecting a branch target address in response to evaluating the branch condition. The method further comprises the steps of jumping to the selected branch target address, executing the instruction set at the selected branch target address, implicitly jumping to a recombine target address after executing the instruction set at the branch target address, and executing the instruction set at the recombine target address.

Other systems, methods, features, and advantages of the invention will be, or become, apparent to one with skill in the art upon examination of the following figures and detailed description. It is intended that all such additional systems, methods, features, and advantages be included within the scope of the invention, and be protected by the accompanying claims.

BRIEF DESCRIPTION OF THE DRAWINGS

The above and further features, advantages, and benefits of the present invention will be apparent upon consideration of the following detailed description, taken in conjunction with the accompanying drawings, in which like reference characters refer to like parts throughout.

FIG. 1C is a non-limiting example showing an implementation of the memory configuration of FIG. 1B.

FIG. 2C is a non-limiting example showing an implementation of the memory configuration of FIG. 2B.

FIG. 3C is a non-limiting example showing an implementation of the memory configuration of FIG. 3B.

FIG. 4C is a non-limiting example showing an implementation of the memory configuration of FIG. 4B.

FIG. 5C is a non-limiting example showing an implementation of the memory configuration of FIG. 5B.

FIG. 6C is a non-limiting example showing an implementation of the memory configuration of FIG. 6B.

FIG. 7B is a non-limiting example showing an implementation of the memory configuration of FIG. 7A.

FIG. 8B is a non-limiting example showing an implementation of the memory configuration of FIG. 8A.

FIG. 10B is a non-limiting example of the memory configuration of FIG. 10A.

DETAILED DESCRIPTION OF DRAWINGS

Figure 1A:
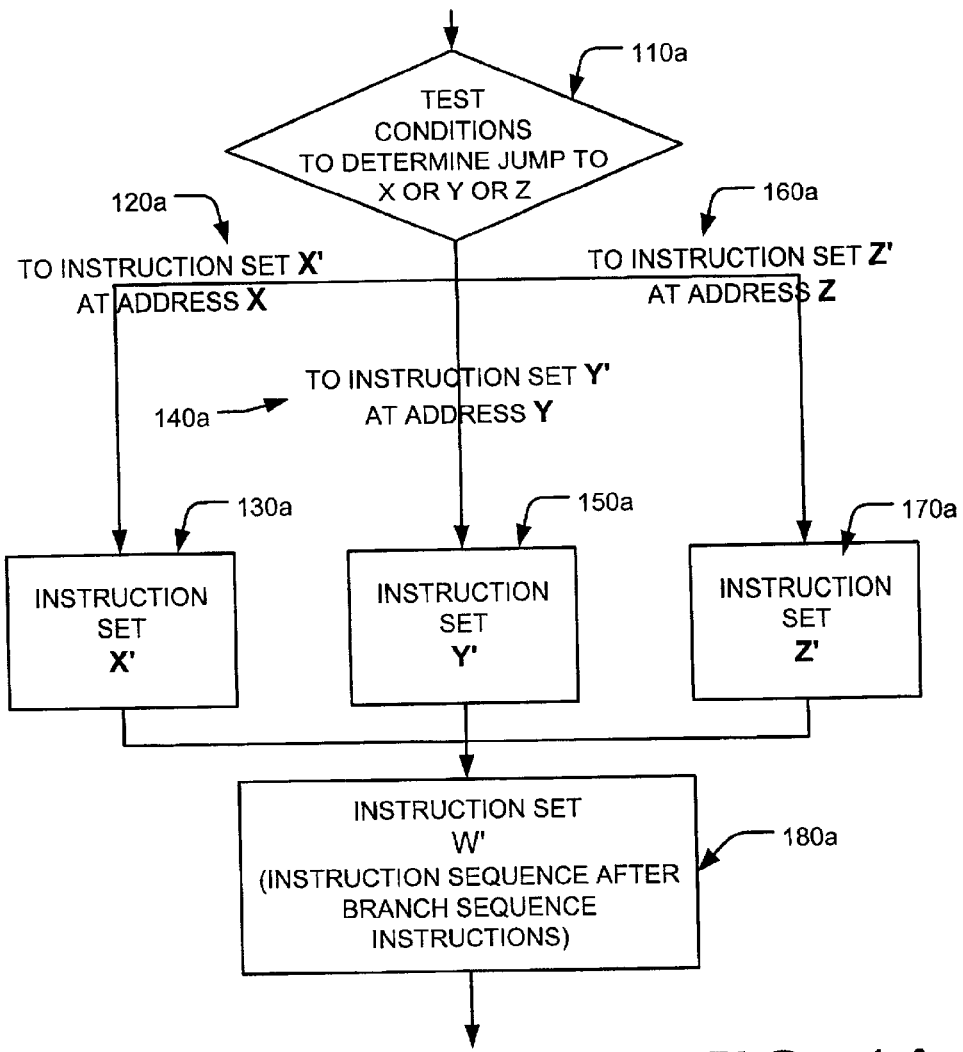
FIG. 1A is a diagram illustrating an embodiment of the invention for a ternary branch instruction wherein absolute branch target addresses are provided for each of the branch conditions.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

While limited attempts have been made to perform ternary branch instructions, these attempts have failed to truly implement a general ternary branch instruction. This is because a truly general ternary branch instruction would require the encoding of four addresses: three "branch" addresses (one for each of the branch conditions) and one "recombine" address to which the processor jumps after executing the appropriate branch instruction set. Since the instruction width in processors is typically 16, 32, or 64 bits, the encoding of four addresses in a single instruction word produces an impracticably long instruction word. In order to circumvent this problem, the instruction length may be exchanged for hardware complexity, thereby producing a more manageable instruction word. Several embodiments of the invention are described below, wherein a ternary branch instruction word is shown with its accompanying hardware configuration. In all of the embodiments shown, the processor is configured to compute branch target addresses from the provided information in the ternary branch instruction word. Additionally, the processor is configured to compute the number of instructions that are associated with each of the instruction sets. Also, the processor is configured to compute a recombine address, which is the address location to which the processor implicitly jumps after executing the appropriate instruction set. For purposes of clarity, the system below is described as having two states, which are indicated as NormalState, wherein a program counter (PC) increments every cycle, and TernaryBranchState, wherein a specified ternary branch instruction set is executed. These hardware configurations will be discussed in greater detail with reference to FIGS. 1A through 10.

FIG. 1A is a diagram illustrating one method of the invention for ternary branch instruction, wherein absolute branch target addresses are provided for each of the branch conditions. A general ternary branch instruction word comprises four address indicators that are used to determine absolute target address locations, which contain processor instruction sets. Thus, the general ternary branch instruction word takes the form:

BRANCH(X, Y, Z, W)

or simply

BR3(Y, Y, Z, W), wherein X, Y, Z, and W are address indicators representing an absolute target address location.

In a simple model, each of the address indicators represents a distinct absolute target address location and, hence, four absolute target address locations are encoded directly into the ternary branch instruction word as address indicators. Each of the absolute target address locations contains an executable processor instruction set. For example, branch target address X contains instruction set X', branch target address Y contains instruction set Y', branch target address Z contains instruction set Z', and the recombine address W contains instruction set W'. As shown in FIG. 1A, the system, in step 110*a*, tests conditions to determine a jump location. In other words, the system, in step 110*a*, evaluates the conditions and selects one of three branch target addresses depending on the result of the evaluation. In a non-limiting example, assume that there are three branch conditions, A<B (hereinafter referred to as condition-X), A>B (hereinafter referred to as condition-Y), and A=B (hereinafter referred to as condition-Z), and three branch target addresses, X, Y, and Z, each having an instruction set, X', Y', and Z', respectively. Depending on which of the three branch conditions are satisfied, a jump is made to one of the three branch target addresses. Thus, if condition-X is met, then the processor, in step 120a, jumps to branch target address X having instruction set X' and, in step 130a, executes instruction set X'. Upon executing 130a instruction set X', the processor, in step 180a, implicitly jumps to a recombine address W having instruction set W' and executes instruction set W'. If, on the other hand, condition-Y is met, then the processor, in step 140a, jumps to branch target address Y having instruction set Y' and, in step 150a, executes instruction set Y'. Upon executing 150a instruction set Y', the processor, in step 180a, implicitly jumps to the recombine address W having instruction set W' and executes instruction set W'. If, on the other hand, condition-Z is met, then the processor, in step 160a, jumps to branch target address Z having instruction set Z', and in step 170a, executes instruction set Z'. Upon executing 170a instruction set Z', the processor, in step 180a, implicitly jumps to the recombine address W having instruction set W' and executes instruction set W'. An example code for executing the ternary branch instruction of FIG. 1A would be:

```
01  if NormalState {
02      if TernaryBranchInstruction {
03          if ConditionX {
04              PC = X;
05              InstructionCounter = Y - X;
06          } elsif ConditionY {
07              PC = Y;
08              InstructionCounter = Z - Y;
09          } else {
10              PC = Z;
11              InstructionCounter = W - Z;
12          }
13          ImplicitJumpAddressRegister = W;
14          goto TernaryBranchState
15      } else {
16          PC = PC + 1;
17          goto NormalState;
18      }
19  } elsif TernaryBranchState {
20      InstructionCounter = InstructionCounter - 1;
21
22      if (InstructionCounter = 0) {
23          PC = ImplicitJumpAddressRegister;
24          goto NormalState;
25      } else {
26          PC = PC + 1;
27          goto TernaryBranchState;
28      }
29  }
```

Figure 1B:
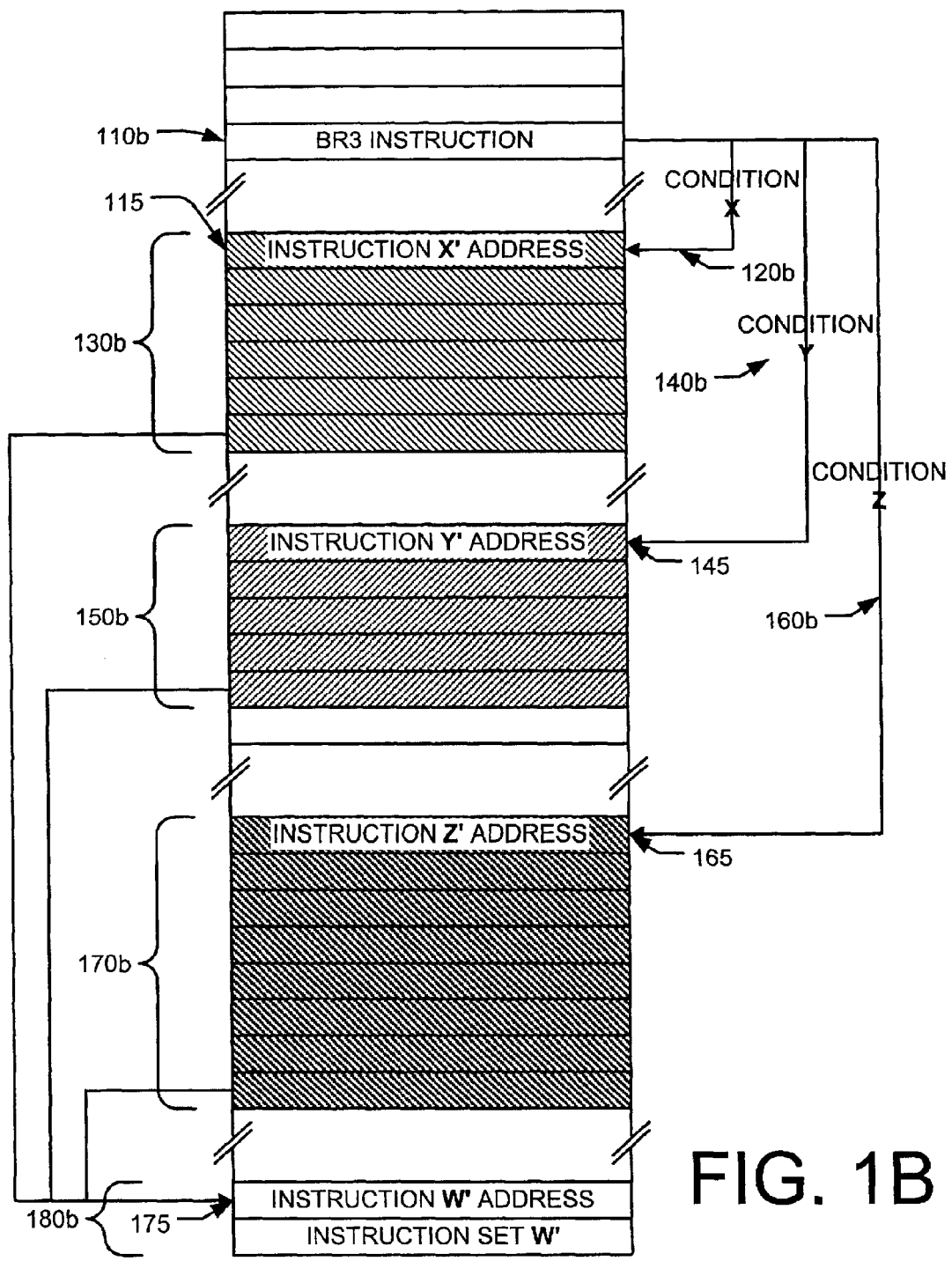
FIG. 1B is a block diagram illustrating a processor memory having the branch instructions for the branch conditions of FIG. 1A.
Figure 1D:
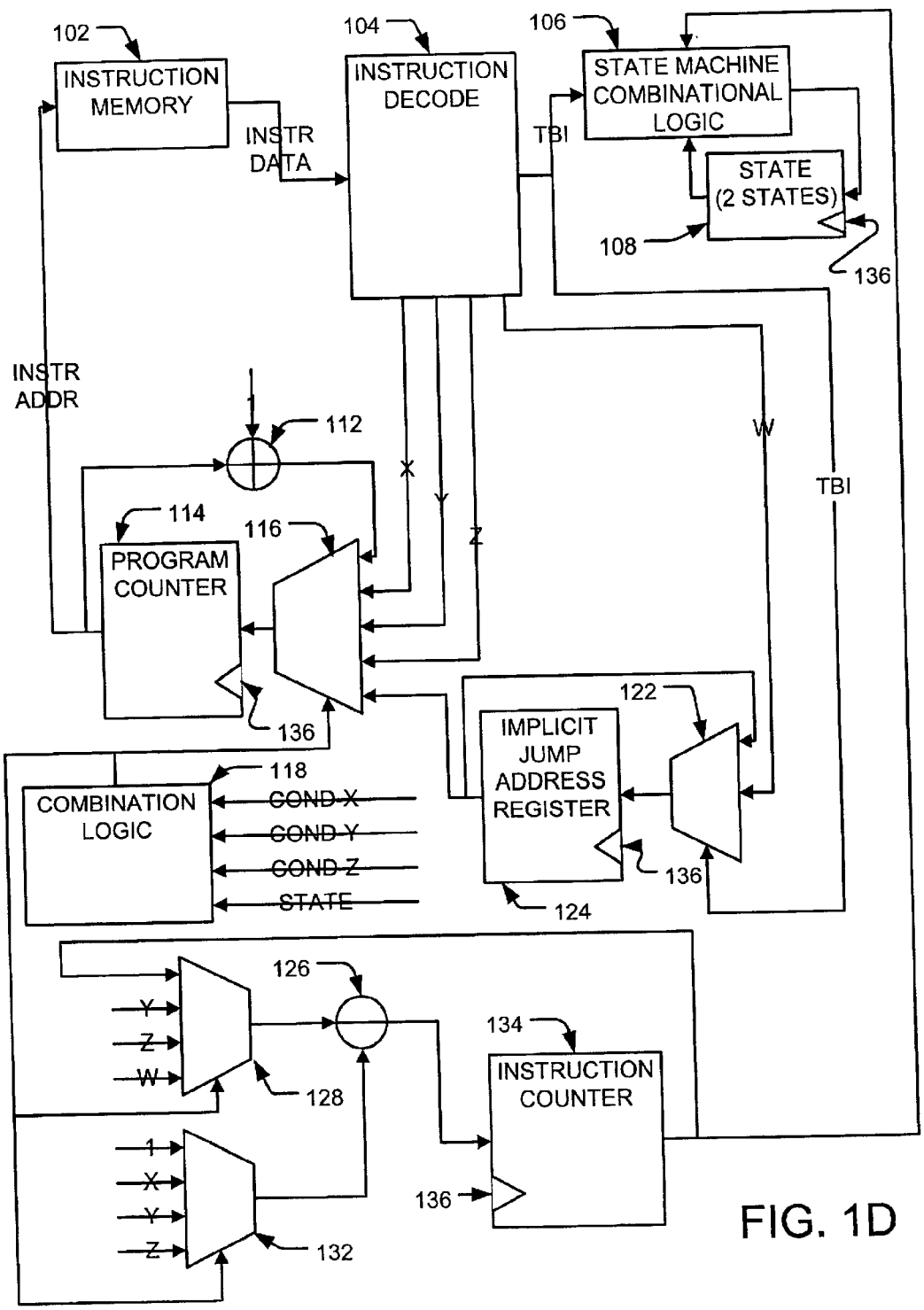
FIG. 1D is a non-limiting example of a hardware configuration that may be used to implement the embodiment shown in FIG. 1A.

Thus, given the above example code, a corresponding example of the hardware implementation would be similar to that shown in FIG. 1D, which is a non-limiting example of a hardware configuration that may be used to implement the embodiment shown in FIG. 1A. As shown here, an example hardware configuration comprises an instruction memory 102 configured to receive the instruction address from a program counter (PC) 114. The system further comprises an instruction decoder 104, which retrieves instruction data from the instruction memory and generates the X, Y, Z, and W addresses and the decoded ternary branch instruction signal. The ternary branch instruction signal is received by a state machine combinational logic 106, which determines whether the system is operating in NormalState or TernaryBranchState. In addition, the ternary branch instruction signal controls MUX 122 which generates the input for the ImplicitJumpAddressRegister 124. Furthermore, the system comprises a 5×1 multiplexer (MUX) 116, which has, as its inputs, X, Y, Z, PC+1 (i.e., the increment of the program counter), and the address of W (e.g., the address in ImplicitJumpAddressRegister 124). Also, if the instructions occupy contiguous portions of memory, then the lengths of the instructions may be determined by two 4×1 MUXs 128, 132, which selectively output address locations for subtraction by a subtracting logic 126 to produce the lengths of the instruction sets. For example, if all instruction sets are located in contiguous portions of memory, then the length of instruction set X' would be Y-X, the length of Y' would be Z-Y, etc. The result of the subtraction is received by an instruction counter 134, which is configured to count down at each clock 136 cycle until the branch instruction has been executed at 0×0. The combinational logic block 118 generates the select for MUXs 136, 128 and 132. While one embodiment of this implementation is shown in FIG. 1D, it will be clear to one of ordinary skill in the art that the hardware configuration may be modified to varying degrees or, alternatively, other hardware configurations may be used to achieve a similar function. The intent is to cover all such modifications and alternate configurations.

One point to note here is that, while the above code and hardware are configured to perform a general ternary branch instruction, the encoding of four absolute addresses in an instruction word is inefficient because the bit-length of the word would be enormous. In any event, as shown here, a general ternary branch instruction word contains four address indicators, which point to the three separate branch target addresses and the one recombine target address. Additionally, for a very general implementation of ternary branch instructions, the instruction-word contains three more parameters representing the size (or length) of each of the instruction sets, X', Y', and Z'. This, however, makes the ternary branch instruction word very cumbersome to implement. Additionally, if four of the seven parameters are absolute target address locations, then these parameters, depending on the processor configuration, may be very large (i.e., the absolute target address may be several bits in length). FIGS. 2A through 10 provide different approaches that may be used to reduce the complexity of ternary branch instructions by reducing the number of encoded address indicators and/or reducing the size of the encoded address indicators.

FIG. 1B is a block diagram illustrating a processor memory having the branch instructions for the branch conditions of FIG. 1A. In this illustration, the ternary branch instruction word is represented as

BRANCH(X, Y, Z, W)

or simply

BR3(X, Y, Z, W), wherein X, Y, Z, and W are absolute branch target addresses. As shown in FIG. 1B, the processor memory comprises a ternary branch instruction word (hereinafter referred to as BR3) located at a fixed address 110b, a branch target instruction set X' 130b having a finite length and located at fixed address X 115, a branch target instruction set Y' 150b having a finite length and located at fixed address Y 145, a branch target instruction set Z' 170b having a finite length and located at fixed address Z 165, and a recombine target instruction set W' 180b located at fixed address W 175. If the test of BR3 110b results in condition-X 120b, then the system jumps to X 115, steps through X' 130b beginning at X 115 until X' 130b has been fully executed, and then implicitly jumps to W 175 and executes W' 180b. If, however, the test of BR3 110b results in condition-Y, then the system jumps to Y 145, steps through Y' 150b until Y' 150b has been fully executed, and then implicitly jumps to W 175 and executes W' 180b. If however, the test of BR3 110b results in condition-Z 160b, then the system jumps to Z 165, steps through Z' 170b until Z' 170b has been fully executed, and then implicitly jumps to W175 and executes W' 180b.

FIG. 1C is a non-limiting example showing a specific implementation of the general memory configuration of FIG. 1B. In order to more clearly illustrate the non-limiting example of FIG. 1B, specific absolute branch target address locations and instruction set sizes are provided in FIG. 1C. For instance, in this non-limiting example, BR3 is located at an absolute address of 1000000, X' begins at address 1000002 and is three instructions in length, Y' begins at address 1000010 and is three instructions in length, Z' begins at address 1000005 and is five instructions in length, and W' begins at address 1000013. Thus, the specific ternary branch instruction word takes the form:

BR3(1000002, 1000010, 1000005, 1000013).

At the end of each of the branch instruction sets, X', Y', and Z', there is an implicit jump to the recombine instruction set W' at address 1000013. As shown from the non-limiting example of FIG. 1C, a ternary branch instruction word may encode four very long parameters, thereby making it cumbersome to encode such a ternary branch instruction word. The following non-limiting examples provide ways to reduce the complexity of a ternary branch instruction word by either reducing the number of encoded parameters and/or the size of the encoded parameters.

Figure 2A:
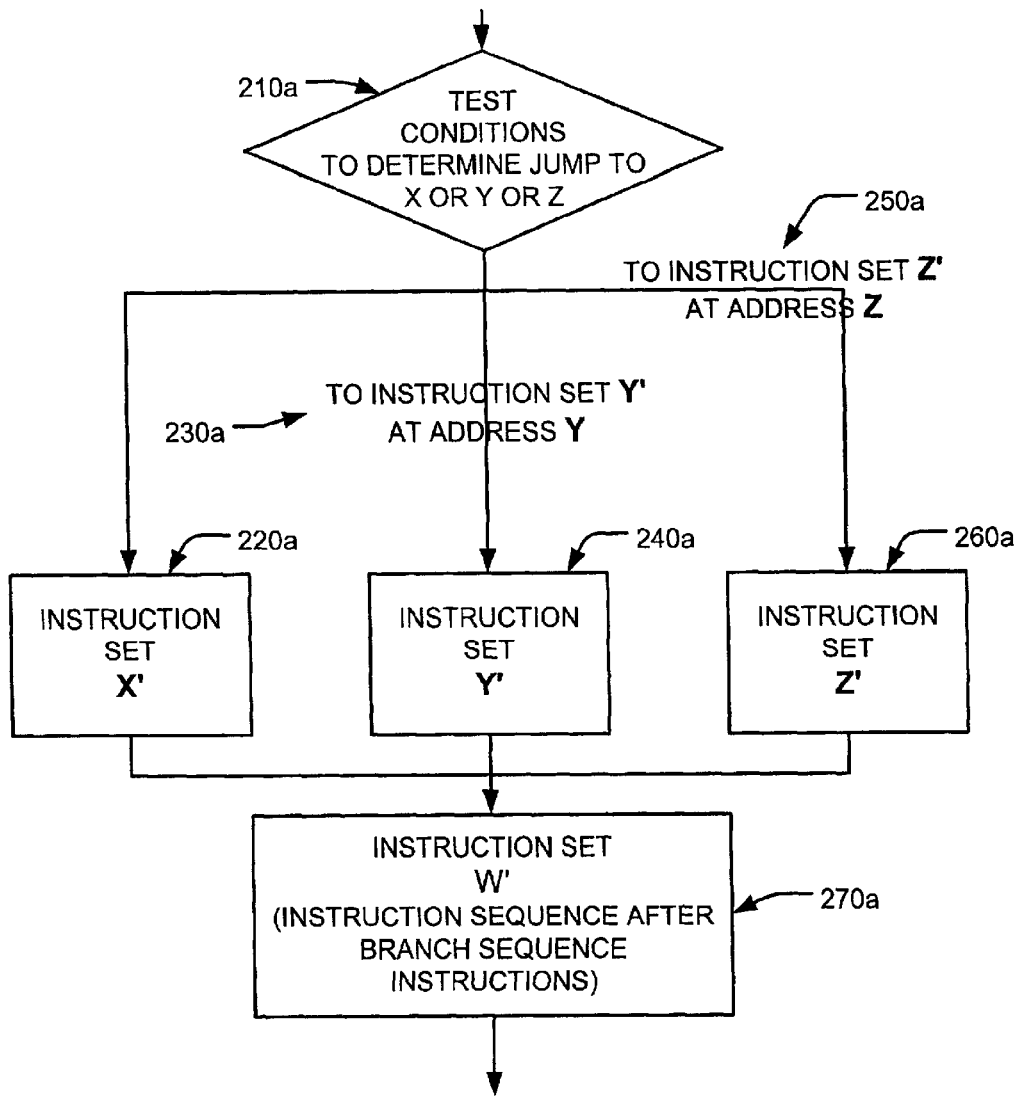
FIG. 2A is a diagram illustrating an embodiment of the invention for a ternary branch instruction wherein a default branch target address is provided for one of the branch conditions, and absolute branch target addresses are provided for each of the remaining branch conditions.

FIG. 2A is a branch diagram illustrating an embodiment of the method of the invention for ternary branch instruction, wherein absolute branch target addresses are encoded for two of the three branch conditions, and a fixed address is used for the third branch condition. Thus, in this non-limiting example, the ternary branch instruction word takes the form:

BRANCH(Y, Z, W)

or

BR3(Y, Z, W), thereby not encoding X but, rather, having X as a default address or implicit address. In a preferred embodiment, the equality condition (i.e., condition-Z or A=B) would be the default condition, rather than condition-X. However, the assignment of the default condition may be arbitrarily implemented, as shown in this example having condition-X as the default condition. As shown in FIG. 2A, the system, in step 210a, tests the conditions to determine a jump location. In other words, the system, in step 210a, evaluates these conditions and selects one of three branch target addresses depending on the result of the evaluation. Again, the assumption is that there are three branch conditions, condition-X, condition-Y, and condition-Z, and three branch target addresses, X, Y, and Z, each having an instruction set, X', Y', and Z', respectively. Depending on which of the three branch conditions are satisfied, a jump is made to one of the three branch target addresses. Unlike FIG. 1A, however, rather than having X encoded into BR3, X is a fixed address (or a default branch address location) that need not be encoded in BR3. Thus, if condition-X is met, then the processor, in step 220a, jumps to the default location and executes instruction set X'. Upon executing 220a instruction set X', the processor, in step 270a, implicitly jumps to a recombine address W having instruction set W' and executes instruction set W'. If, on the other hand, either condition-Y or condition-Z are met in step 210a, then the system operates in similar fashion to the operation of FIG. 1A for condition-Y and condition-Z.

The hardware configuration here would be similar to the hardware configuration as explained in FIG. 1A, with the only difference being that one of the inputs of the MUX is removed, thereby having a 4×1 MUX with inputs Y, Z, PC+1, and ImplicitJumpAddressRegister. While the particular example of FIG. 2A shows X as the default address, it will be clear to one of ordinary skill in the art that either Y or Z could have been used as the default address in place of X.

Figure 2B:
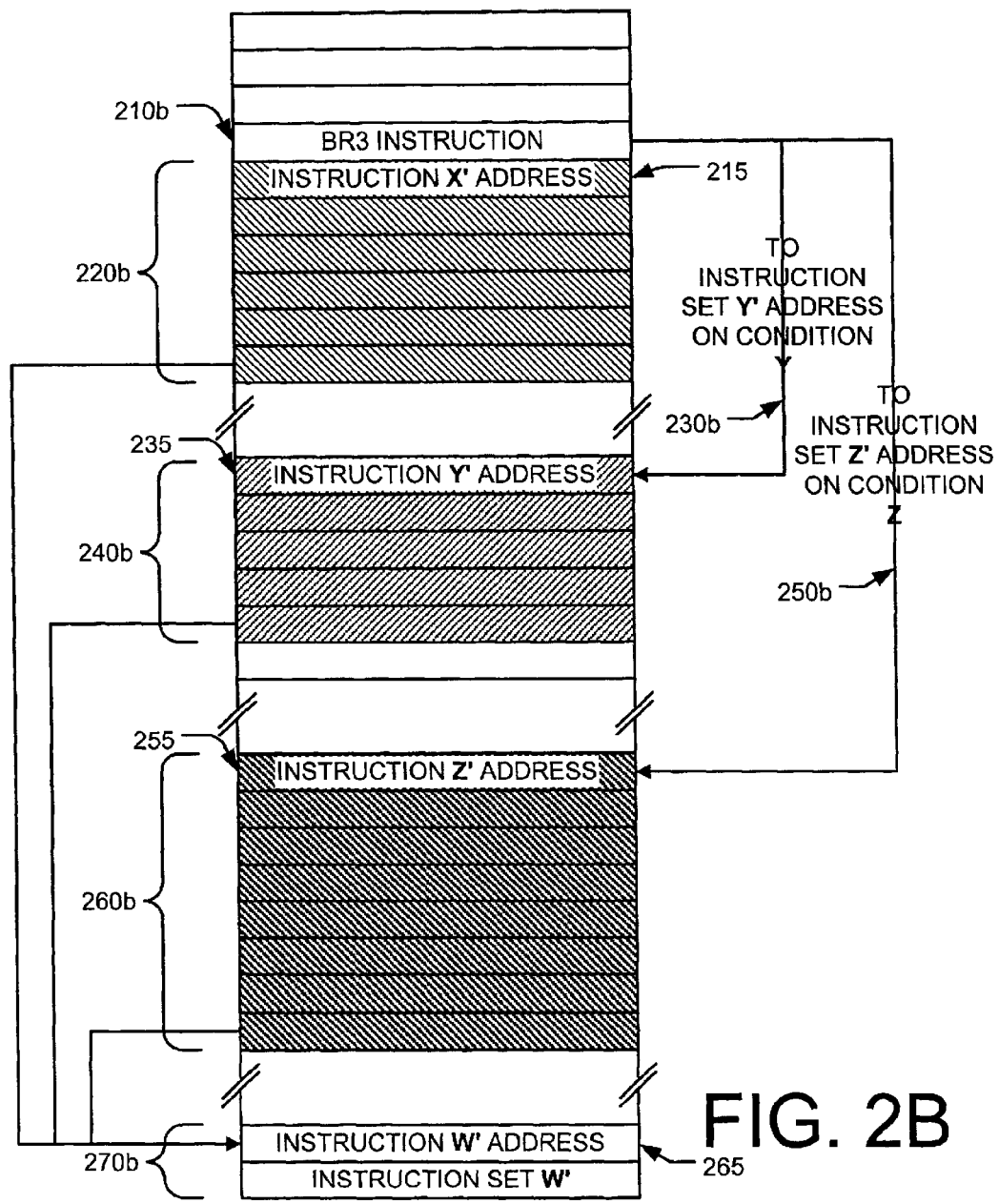
FIG. 2B is a block diagram illustrating a processor memory having the branch instructions for the branch conditions of FIG. 2A.

FIG. 2B is a block diagram illustrating a processor memory having the branch instructions for the branch conditions of FIG. 2A. In this illustration, the ternary branch instruction word is represented as:

BRANCH(Y, Z, W)

or simply

BR3(Y, Z, W), wherein Y, Z, and W are absolute branch target addresses. As shown in FIG. 2B, the processor memory comprises BR3 located at a fixed address 210b, X' 220b having a finite length and located at X 215, Y' 240b having a finite length and located at Y 235, Z' 260b having a finite length and located at Z 255, and W' 270b located at W 265. If the test of BR3 210b results in condition-X, then the system jumps to the next contiguous instruction where X' 220b begins, steps through X' 220b until X' 220b has been fully executed, and then implicitly jumps to W 265 and executes W' 270b. If, however, the test of BR3 210b results in either condition-Y 230b or condition-Z 250b, then the system operates in similar fashion to the operation of FIG. 2A for condition-Y and condition-Z.

FIG. 2C is a non-limiting example showing a specific implementation of the general memory configuration of FIG. 2B. In order to more clearly illustrate the non-limiting example of FIG. 2B, specific absolute branch target address locations and instruction set sizes are provided in FIG. 2C. For instance, in this non-limiting example, BR3 is located at an absolute address of 1000000, X' is three instructions in length and begins at fixed default location 1000001, which is the memory location immediately following BR3; Y' begins at address 1000010 and is three instructions in length, Z' begins at address 1000004 and is six instructions in length, and W' begins at address 1000013. Thus, the specific ternary branch instruction word for this non-limiting example would be:

BR3(1000010, 1000004, 1000013), which has only three encoded parameters.

Given the three parameters and the one default parameter (which is not encoded), the ternary branch instruction word would translate to:

BR3([default,] 1000010, 1000004, 1000013), which would, in turn, translate to a ternary branch instruction word having absolute address locations for X', Y', Z', and W' as:

BR3(1000001, 1000010, 1000004, 1000013).

As seen from this example, the four absolute target addresses may be encoded using only three parameters, since one of the addresses is defined by a default address and need not be specifically encoded into the ternary branch instruction word.

At the end of each of the branch instruction sets, X', Y', and Z', there is an implicit jump to the recombine instruction set W' at address 1000013. Thus, from the non-limiting example shown in FIGS. 2A, 2B and 2C, an implicit (or default) parameter may be used. This reduces the number of parameters, thereby reducing the length of the ternary branch instruction word.

Figure 3A:
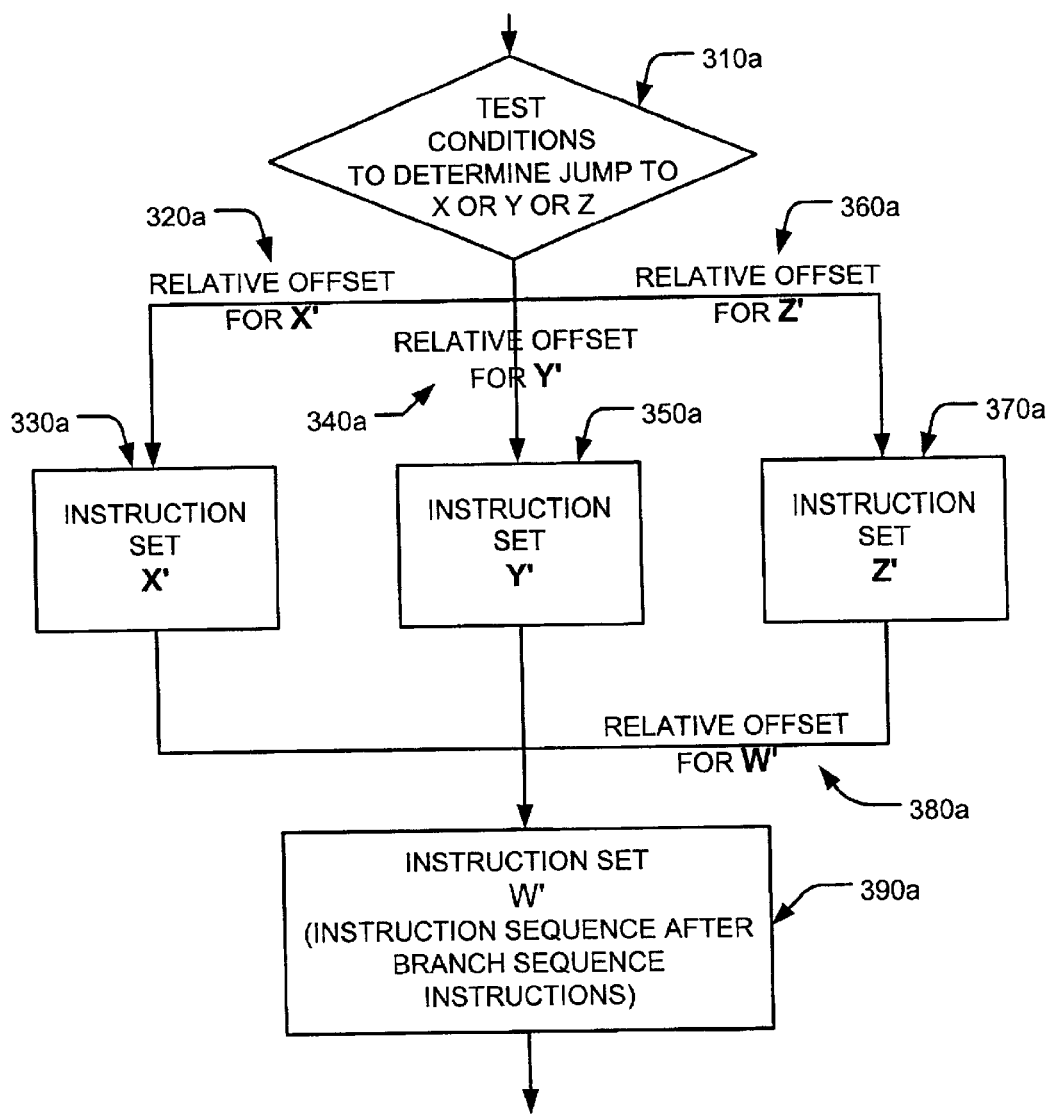
FIG. 3A is a diagram illustrating an embodiment of the invention for a ternary branch instruction wherein relative address offsets are provided for each of the branch conditions.

FIG. 3A is a branch diagram illustrating an embodiment of the method of the invention for ternary branch instruction, wherein relative address offsets are used as address indicators. Thus, in this non-limiting example, the ternary branch instruction word takes the form:

BRANCH($X_{OFF}$, $Y_{OFF}$, $Z_{OFF}$, $W_{OFF}$)

or simply

BR3($X_{OFF}$, $Y_{OFF}$, $Z_{OFF}$, $W_{OFF}$), wherein $X_{OFF}$, $Y_{OFF}$, $Z_{OFF}$, and $W_{OFF}$ represent the relative offset from BR3 at which X', Y', Z', and W', respectively, may be found.

As shown in FIG. 3A, the system, in step 310a, tests the conditions to determine a jump location. In other words, the system, in step 310a, evaluates these conditions and selects one of three branch target addresses depending on the result of the evaluation. Again, the assumption is that there are three branch conditions, condition-X, condition-Y, and condition-Z, and three branch target addresses, X, Y, and Z, each having an instruction set, X', Y', and Z', respectively. Depending on which of the three branch conditions is satisfied, a jump is made to one of the three branch target addresses. Since, in these examples, an absolute branch target address is not provided, the system must first determine these values from the relative address offsets. This is done by the processor, which adds the relative offset to the address location of BR3. Thus, X would be at an address that is $X_{OFF}$ added to the address of BR3, Y would be at an address that is $Y_{OFF}$ added to the address of BR3, Z would be at an address that is $Z_{OFF}$ added to the address of BR3, and W would be at an address that is $W_{OFF}$ added to the address of BR3. Once the absolute target addresses have been determined, the remaining steps of the ternary branch instruction are similar to that shown in FIG. 1A.

Since relative offsets are used for this example, an example code associated with FIG. 3A would be:

```
01   if NormalState {
02        if TernaryBranchInstruction {
03             if ConditionX {
04                  PC = PC + Xoff;
05                  InstructionCounter = Yoff - Xoff;
06             } elsif ConditionY {
07                  PC = PC + Yoff;
08                  InstructionCounter = Zoff - Yoff;
09             } else {
10                  PC = PC+ Zoff;
11                  InstructionCounter = Woff - Zoff;
12             }
13             ImplicitJumpAddressRegister = PC + Woff;
14             goto TernaryBranchState
15        } else {
16             PC = PC + 1;
```

-continued

```
17             goto NormalState;
18        }
19   } elsif TernaryBranchState {
20        InstructionCounter = InstructionCounter - 1;
21
22        if (InstructionCounter = 0) {
23             PC = ImplicitJumpAddressRegister;
24             goto NormalState;
25        } else {
26             PC = PC + 1;
27             goto TernaryBranchState;
28        }
29   }
```

From this example code, it can be seen that the accompanying hardware would now have a program counter with a MUX having inputs 0×1, $X_{OFF}$, $Y_{OFF}$, and $Z_{OFF}$. Also, the hardware comprises an additional adder to compute PC+$W_{OFF}$. However, the advantage here is the simplicity of the instruction encoding because fewer bits are required to encode the address indicators.

The system of FIG. 3A may be simplified further in that, rather than having four relative address offsets, the system may provide a default offset for one of the address locations, thereby having only three address indicators. Thus, the ternary branch instruction word would take the form:

BRANCH($Y_{OFF}$, $Z_{OFF}$, $W_{OFF}$)

or

BR3($Y_{OFF}$, $Z_{OFF}$, $W_{OFF}$), having three parameters rather than four parameters.

Figure 3B:
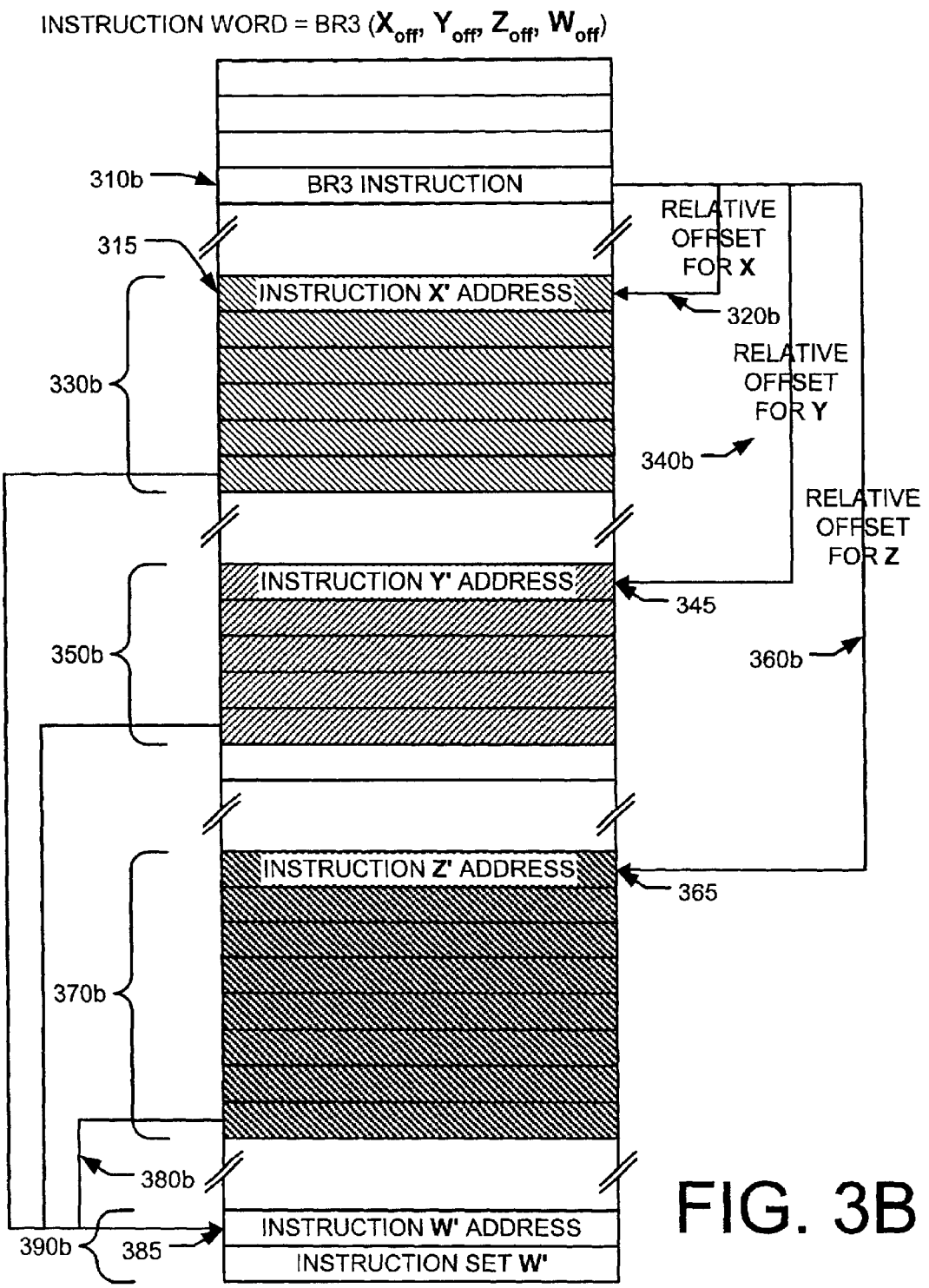
FIG. 3B is a block diagram illustrating a processor memory having the branch instructions for the branch conditions of FIG. 3A.

FIG. 3B is a block diagram illustrating a processor memory having the branch instructions for the branch conditions of FIG. 3A having four parameters. In this illustration, the ternary branch instruction word is represented as:

BRANCH($X_{OFF}$, $Y_{OFF}$, $Z_{OFF}$, $W_{OFF}$)

or simply

BR3($X_{OFF}$, $Y_{OFF}$, $Z_{OFF}$, $W_{OFF}$), wherein $X_{OFF}$, $Y_{OFF}$, $Z_{OFF}$, and $W_{OFF}$ are relative address offsets. The memory configuration in FIG. 3B is similar to the memory configuration in FIG. 1B, the only difference being that the ternary branch instruction word now encodes the relative address offsets rather than the absolute target address locations. Thus, in this non-limiting example, if condition-X is met, then the system jumps to an address having X' that is $X_{OFF}$ from the address of BR3 and executes X'; if condition-Y is met, then the system jumps to an address having Y' that is $Y_{OFF}$ from the address of BR3 and executes Y'; if condition-Z is met, then the system jumps to an address having Z' that is $Z_{OFF}$ from the address of BR3 and executes Z'. Upon executing the appropriate instruction set (either X', Y', or Z'), the system implicitly jumps to W, which is at an address that is $W_{OFF}$ from the address of BR3.

FIG. 3C is a non-limiting example showing a specific implementation of the general memory configuration of FIG. 3B. In order to more clearly illustrate the non-limiting example of FIG. 3B, specific relative address offsets and instruction set sizes are provided in FIG. 3C. For instance, in this non-limiting example, BR3 is located at an absolute address of 1000000, which is designated as offset 0. X', Y', Z', and W' are located at addresses that are offset from 1000000 by 2, 10, 5, and 13, respectively. Thus, the specific ternary branch instruction word would take the form:

BR3(2, 10, 5, 13).

Given this ternary branch instruction word, the absolute addresses may be derived by using hardware (e.g., logic components) that are configured to compute the absolute target address locations as:

BR3(1000000+2, 1000000+10, 1000000+5, 1000000+13), which, in turn, results in a ternary branch instruction word having absolute target address locations for X', Y', Z', and W' as:

BR3(1000002, 1000010, 1000005, 1000013).

As seen from this example, by using relative address offsets rather than absolute target address locations, the size of the encoded parameters is reduced, thereby reducing the length of the branch instruction word. Thus, since the offsets typically have fewer bits than the absolute target addresses, the encoding using relative offsets would be much smaller than the encoding using absolute addresses.

Figure 4A:
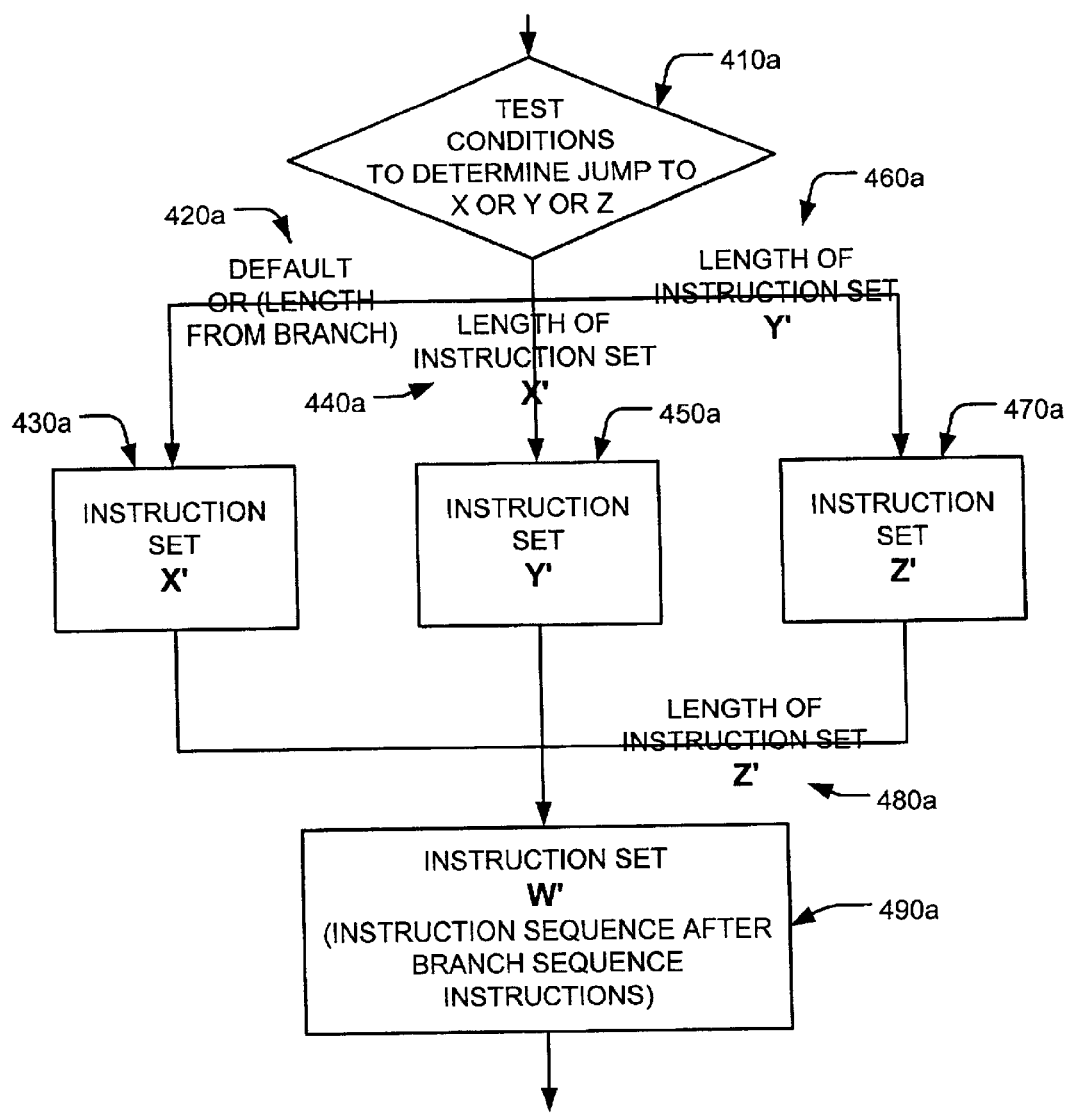
FIG. 4A is a diagram illustrating an embodiment of the invention for a ternary branch instruction wherein the block size of instruction sets are provided as address indicators.

FIG. 4A is a branch diagram illustrating an embodiment of the method of the invention for ternary branch instruction, wherein the sizes (or lengths) of the instruction sets are used as address indicators. Thus, in this non-limiting example, the ternary branch instruction word takes the form:

BRANCH($L_{BR}$, $L_X$, $L_Y$, $L_Z$)

or simply

BR3($L_{BR}$, $L_X$, $L_Y$, $L_Z$), wherein $L_{BR}$, $L_X$, $L_Y$, and $L_Z$ represent the lengths of instruction sets (X'+Y'+Z'), X', Y', and Z', respectively.

Alternatively, since $L_{BR}$ is $L_X+L_Y+L_Z$, $L_{BR}$ may be a default parameter, thereby converting the ternary branch instruction word to the three-parameter instruction word:

BRANCH($L_X$, $L_Y$, $L_Z$)

or

BR3($L_X$, $L_Y$, $L_Z$).

As shown in FIG. 4A, the system, in step 410a, tests the conditions to determine a jump location. In other words, the system, in step 410a, evaluates these conditions and selects one of three branch target addresses depending on the result of the evaluation. Again, the assumption is that there are three branch conditions, condition-X, condition-Y, and condition-Z, and three branch target addresses, X, Y, and Z, each having an instruction set, X', Y', and Z', respectively. Depending on which of the three branch conditions are satisfied, a jump is made to one of the three branch target addresses. Since, in these examples, an absolute branch target address is not provided, the system must first determine these values from the lengths of the instruction sets.

In order to accomplish this, the instruction sets must be in a specific order and, additionally, must also occupy contiguous portions of the processor memory. If these two conditions are met, then the processor may determine the absolute address locations by cumulatively adding the instruction set sizes. For instance, X would be a default location immediately adjacent to the address of BR3, Y would be at an address that is $L_X$ offset from the address of BR3, Z would be at an address that is $L_X+L_Y$ offset from the address of BR3, and W would be $L_X+L_Y+L_Z$ offset from the address of BR3. Once the absolute target addresses have been determined from the sizes of the instruction sets, the remaining steps of the ternary branch instruction are similar to that shown in FIG. 1A.

An example code for implementing the system of FIG. 4A (wherein three address indicators $L_X$, $L_Y$, and $L_Z$ are encoded) would be:

```
01  if NormalState {
02      if TernaryBranchInstruction {
03          if ConditionX {
04              PC = PC + 1;
05              InstructionCounter = Lx;
06          } elsif ConditionY {
07              PC = PC + Lx;
08              InstructionCounter = Ly;
09          } else {
10              PC = PC + Lx + Ly;
11              InstructionCounter = Lz;
12          }
13          ImplicitJumpAddressRegister = Lx+Ly+Lz;
14          goto TernaryBranchState
15      } else {
16          PC = PC + 1;
17          goto NormalState;
18      }
19  } elsif TernaryBranchState {
20      InstructionCounter = InstructionCounter − 1;
21
22      if (InstructionCounter = 0) {
23          PC = ImplicitJumpAddressRegister;
24          goto NormalState;
25      } else {
26          PC = PC + 1;
27          goto TernaryBranchState;
28      }
29  }
```

Unlike the previous examples, since the instruction length is encoded here and, additionally, since $L_{BR}$ is a function of $L_X$, $L_Y$, and $L_Z$, the system would comprise an additional three-input adder configured to produce $L_{BR}$ as $L_X+L_Y+L_Z$. Regardless of the added hardware, since the instruction lengths are typically less than the relative offsets, the size of the instruction word is further reduced in this example.

Figure 4B:
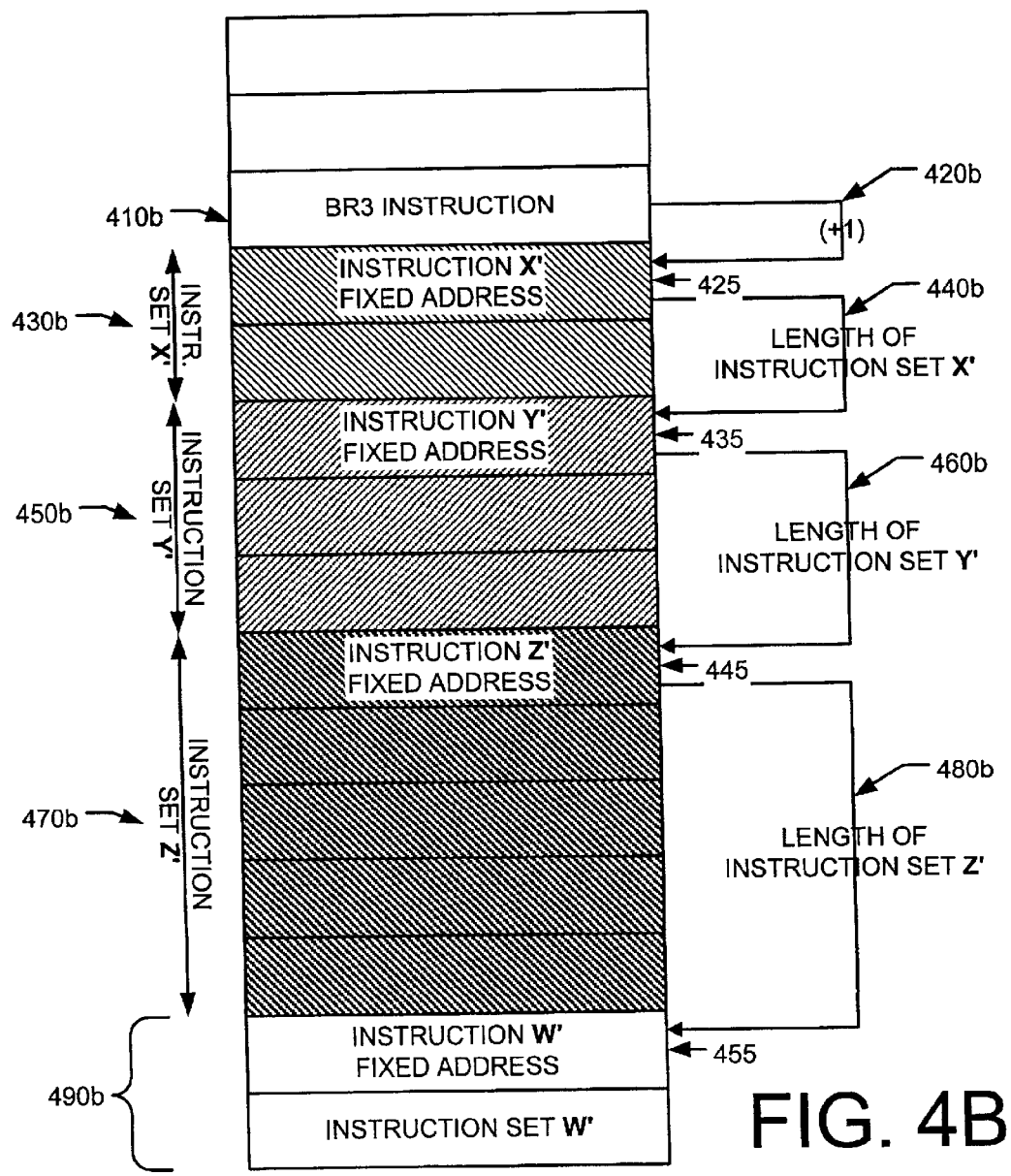
FIG. 4B is a block diagram illustrating a processor memory having the branch instructions for the branch conditions of FIG. 4A.

FIG. 4B is a block diagram illustrating a processor memory having the branch instructions for the branch conditions of FIG. 4A. In this illustration, the ternary branch instruction word is represented as:

BRANCH($L_X$, $L_Y$, $L_Z$)

or simply

BR3($L_X$, $L_Y$, $L_Z$), wherein $L_X$, $L_Y$, and $L_Z$ are the lengths (or sizes) of instruction set X', Y', and Z', respectively. The memory configuration in FIG. 4B shows all of the instruction sets located in contiguous portions of processor memory. In other words, X' follows immediately after BR3, Y' follows immediately after X', Z' follows immediately after Y', and W' follows immediately after Z'. In this non-limiting example, if condition-X is met, then the system jumps to a default address adjacent to BR3 having X' and executes X'; if condition-Y is met, then the system jumps to an address having Y' that is $L_X$ from the address of BR3 and executes Y'; if condition-Z is met, then the system jumps to an address having Z' that is $L_X+L_Y$ from the address of BR3 and executes Z'. Upon executing the appropriate branch instruction set (either X', Y', or Z'), the system implicitly jumps to W, which is at an address that is $L_X+L_Y+L_Z$ from the address of BR3.

FIG. 4C is a non-limiting example showing a specific implementation of the general memory configuration of FIG. 4B. In order to more clearly illustrate the non-limiting example of FIG. 4B, specific relative address offsets and instruction set sizes are provided in FIG. 4C. For instance, in this non-limiting example, BR3 is located at an absolute address of 1000000, which is designated as offset 0. The instruction-set size of X', Y', and Z' are 2, 3, and 5, respectively. Thus, the specific ternary branch instruction word would take the form:

BR3(2, 3, 5).

Given this ternary branch instruction word, the absolute addresses may be derived using hardware logic to derive the absolute target addresses as:

BR3([default,] default+2, default+2+3, default+2+3+5), which gives the ternary branch instruction word having absolute target address locations for X', Y', Z', and W' as:

BR3(1000001, 1000003, 1000006, 1000011).

As seen from this example, by using the size of the instruction sets rather than relative address offsets, the size of the encoded parameters is even further reduced, thereby further reducing the complexity of the branch instruction word.

Figure 5A:
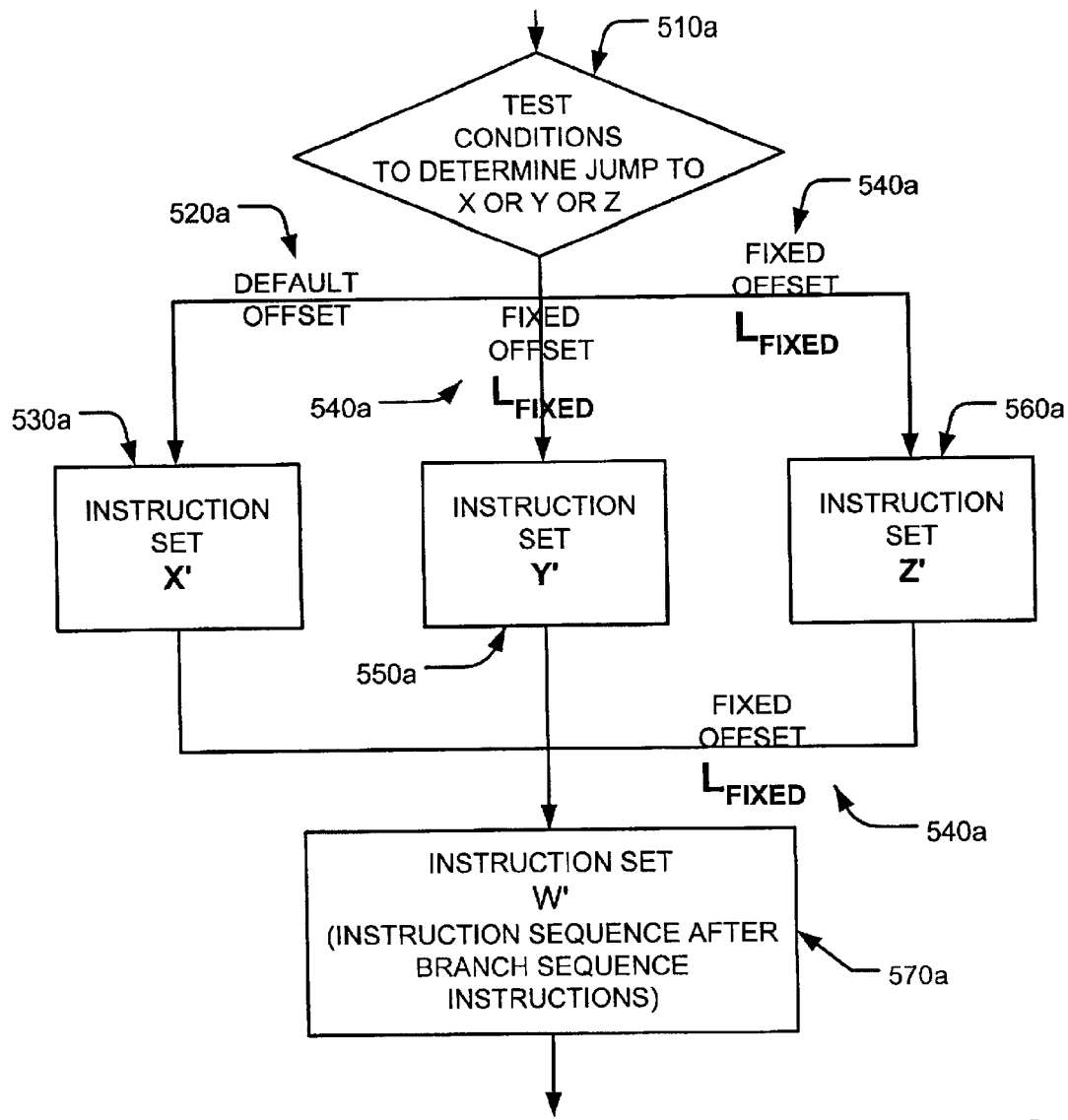
FIG. 5A is a diagram illustrating an embodiment of the invention for a ternary branch instruction wherein the size of each instruction set is the same.

FIG. 5A is a branch diagram illustrating an embodiment of the method of the invention for ternary branch instruction, wherein all the absolute target addresses may be derived from a single address indicator. Thus, in this non-limiting example, the ternary branch instruction word takes the form:

BRANCH($L_{FIXED}$)

or simply

BR3($L_{FIXED}$)

As shown in FIG. 5A, the system, in step 510a, tests the conditions to determine a jump location. In other words, the system, in step 510a, evaluates these conditions and selects one of three branch target addresses depending on the result of the evaluation. Again, the assumption is that there are three branch conditions, condition-X, condition-Y, and condition-Z, and three branch target addresses, X, Y, and Z, each having an instruction set, X', Y', and Z', respectively. Depending on which of the three branch conditions are satisfied, a jump is made to one of the three branch target addresses. Since, in these examples, an absolute branch target address is not provided, the system must first determine these values from $L_{FIXED}$.

In order to accomplish this, the instruction sets must be in a specific order, must occupy contiguous portions of the processor memory, and, also, must be the same length. If these three conditions are met, then the processor may determine the absolute address locations as a function of $L_{FIXED}$. For instance, X would contain X', which is of length (or size) $L_{FIXED}$, and be located at a default location immediately adjacent to the address of BR3; Y would contain Y', which is also of length $L_{FIXED}$, and be offset from BR3 by $L_{FIXED}$; Z would contain Z', which is also of length $L_{FIXED}$, and be offset from BR3 by $2 \times L_{FIXED}$; and W would contain W' and be offset from BR3 by $3 \times L_{FIXED}$. Thus, each of the absolute target addresses may be derived from a single parameter, $L_{FIXED}$. Once the absolute target addresses have been determined, the remaining steps of the ternary branch instruction are similar to that shown in FIG. 1A.

An example code for executing such a process would be:

```
01  if NormalState {
02      if TernaryBranchInstruction {
03          if ConditionX {
04              PC = PC + 1;
05          } elsif ConditionY {
06              PC = PC + Lfixed;
07          } else {
08              PC = PC + Lfixed<<1;
09          }
10          InstructionCounter = Lfixed;
11          ImplicitJumpAddressRegister = Lfixed+Lfixed<<1;
12          goto TernaryBranchState
13      } else {
14          PC = PC + 1;
15          goto NormalState;
16      }
17  } elsif TernaryBranchState {
18      InstructionCounter = InstructionCounter − 1;
19      if (InstructionCounter = 0) {
20          PC = ImplicitJumpAddressRegister;
21          goto NormalState;
22      } else {
23          PC = PC + 1;
24          goto TernaryBranchState;
25      }
26  }
```

As shown from the above example code, a corresponding hardware would remove the three-input adder (from the example of FIG. 4A) and, additionally, the input to the MUX is simplified since there is now only one input $L_{FIXED}$. This configuration allows for a very simple encoding of the ternary branch instruction because all of the addresses are encoded as a function of the single address indicator in the ternary branch instruction word.

Figure 5B:
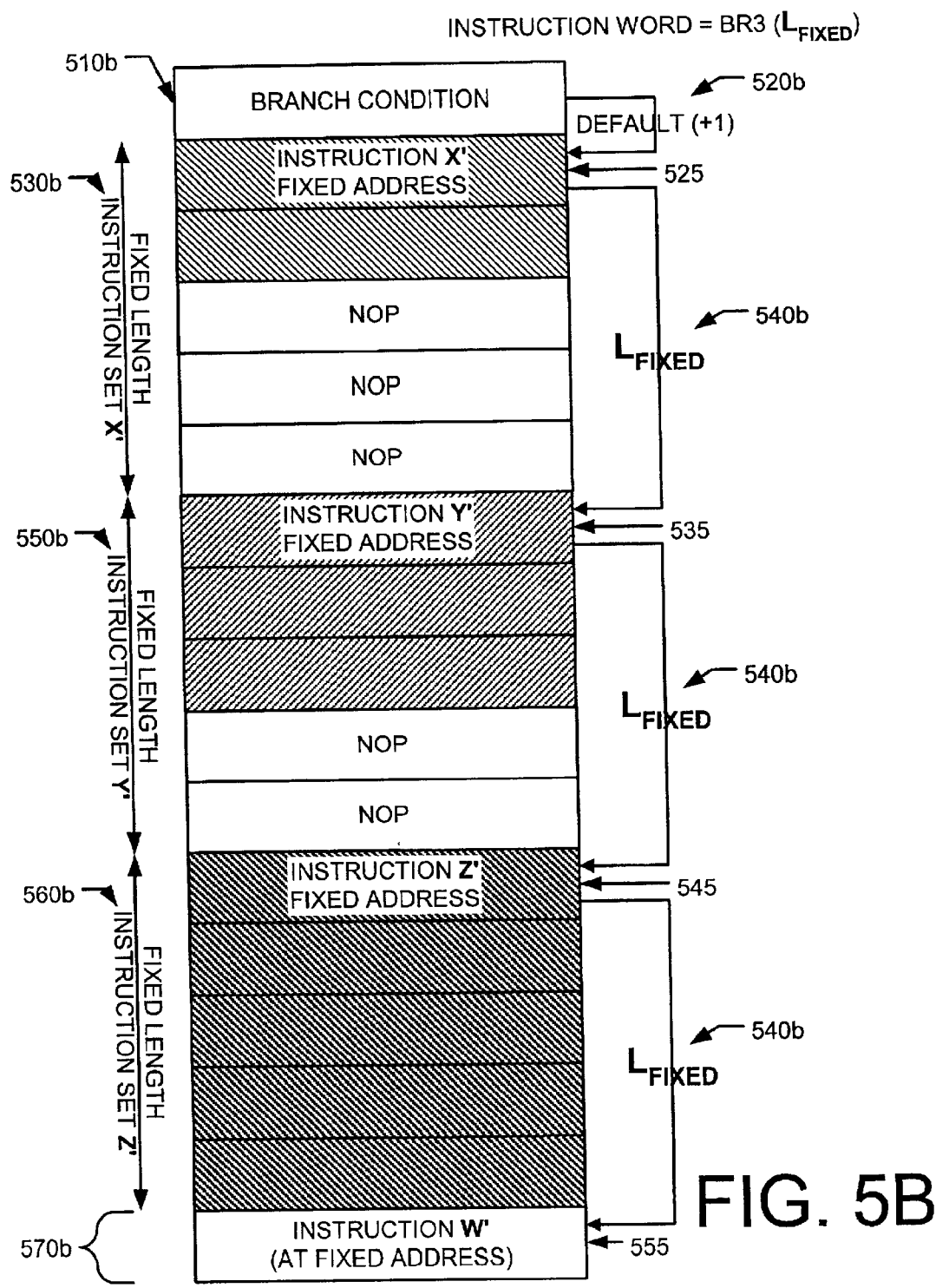
FIG. 5B is a block diagram illustrating a processor memory having the branch instructions for the branch conditions of FIG. 5A.

FIG. 5B is a block diagram illustrating a processor memory having the branch instructions for the branch conditions of FIG. 5A. In this illustration, the ternary branch instruction word is represented as:

BRANCH($L_{FIXED}$)

or simply

BR3($L_{FIXED}$), wherein $L_{FIXED}$ is the fixed length of all of the branch instruction sets. The memory configuration of FIG. 5B shows all of the instruction sets to be the same size. This may be accomplished by filling different size branch instruction sets with "no operation" (NOP) instructions to equalize all branch instruction sets. In addition to having the same size instruction set, the memory configuration in FIG. 5B shows all of the instruction sets as being located in contiguous portions of processor memory. In other words, X' follows immediately after BR3, Y' follows immediately after X', Z' follows immediately after Y', and W' follows immediately after Z'. In this non-limiting example, if condition-X is met, then the system jumps to a default address having X' adjacent to BR3 and executes X'; if condition-Y is met, then the system jumps to an address having Y' that is $L_{FIXED}$ from the address of BR3 and executes Y'; if condition-Z is met, then the system jumps to an address having Z' that is $2 \times L_{FIXED}$ from the address of BR3 and executes Z'. Upon executing one of the three instruction sets, X', Y', or Z', the system implicitly jumps to W, which is at an address that is $3 \times L_{FIXED}$ from the address of BR3.

FIG. 5C is a non-limiting example showing a specific implementation of the general memory configuration of FIG. 5B. In order to more clearly illustrate the non-limiting example of FIG. 5B, specific relative address offsets and instruction set sizes are provided in FIG. 5C. For instance, in this non-limiting example, BR3 is located at an absolute address of 1000000, which is designated as offset 0. The instruction-set sizes of X', Y', and Z' are set to equal fixed lengths of 5. Thus, the specific ternary branch instruction word would take the form:

BR3(5).

Given this ternary branch instruction word, the absolute addresses may be derived using hardware logic configured to derive the absolute target address locations as:

BR3(default, default+5, default+(2×5), default+(3×5)), which gives the ternary branch instruction word having absolute target address locations for X', Y', Z', and W' as:

BR3(1000001, 1000006, 10000011, 1000016).

As seen from this example, by using a fixed size, the total number, as well as the size, of the encoded parameters is reduced, thereby further reducing the length of the branch instruction word.

Figure 6A:
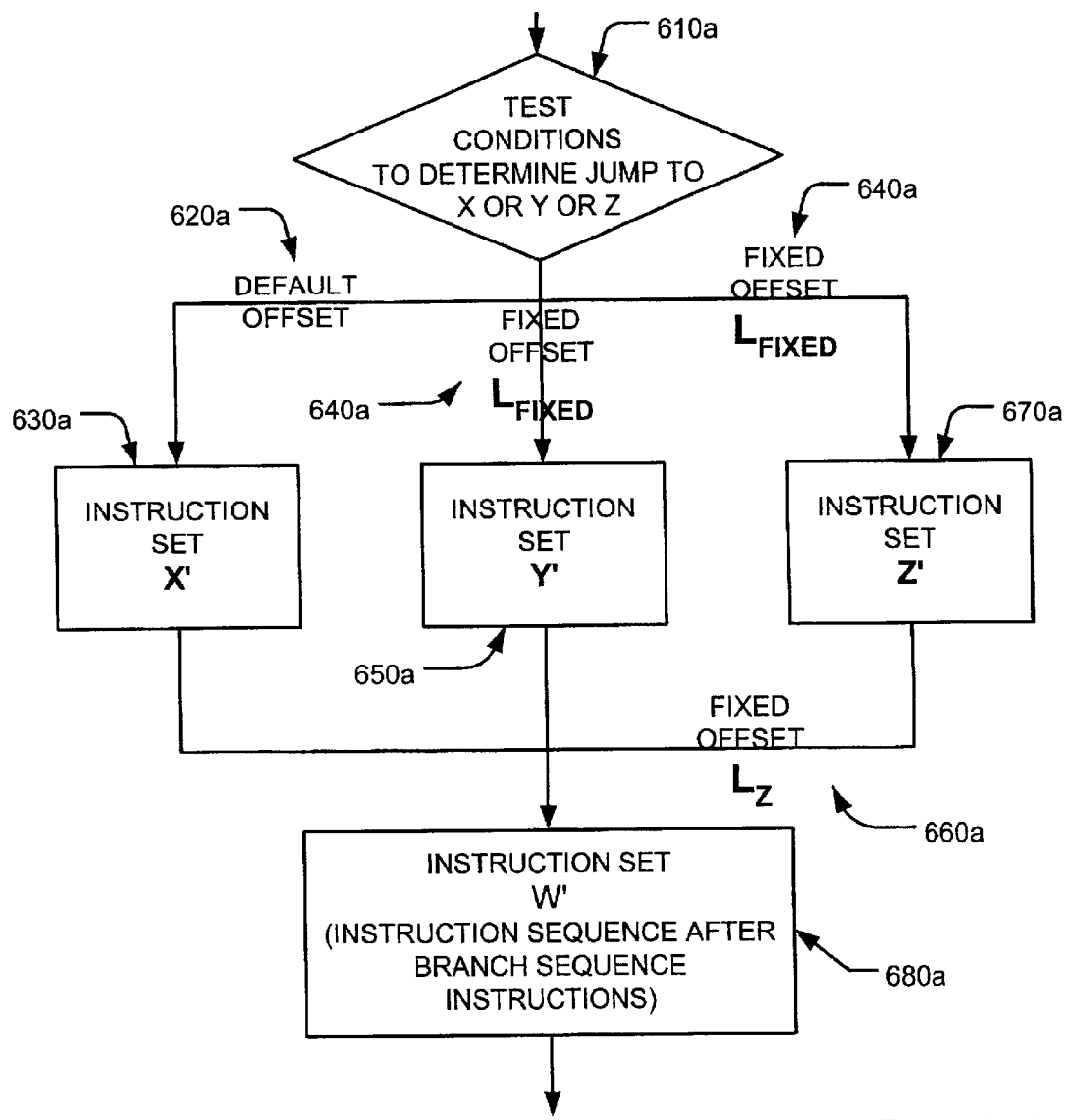
FIG. 6A is a diagram illustrating an embodiment of the invention for a ternary branch instruction wherein the size of two of the instructions sets is the same while the third instruction set is a different size.
Figure 6B:
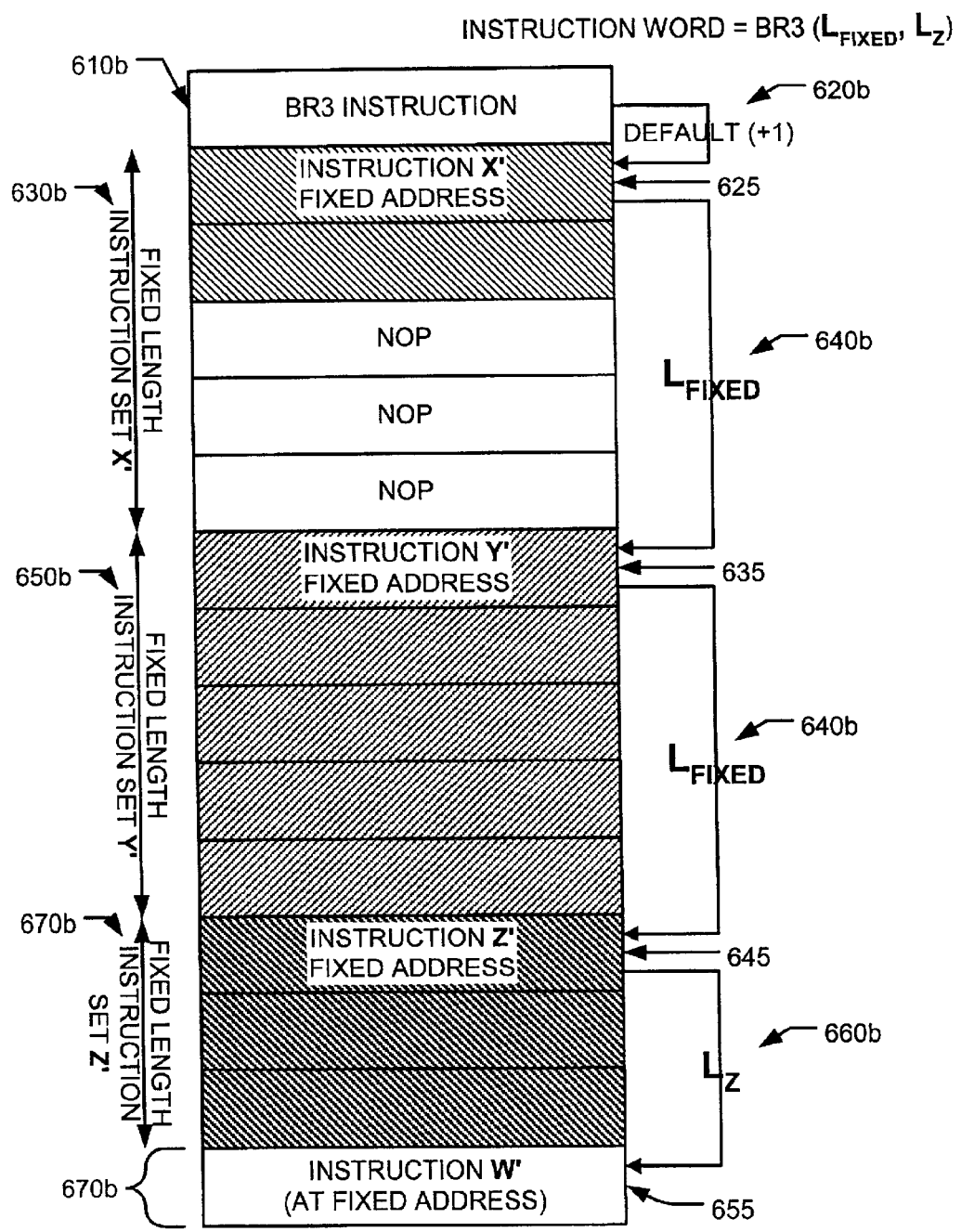
FIG. 6B is a block diagram illustrating a processor memory having the branch instructions for the branch conditions of FIG. 6A.

FIGS. 6A, 6B, and 6C are diagrams illustrating an embodiment of the method of the invention for ternary branch instruction, wherein the lengths of two instruction sets are set equal while the length of the third instruction set is set to a fixed length. In the non-limiting examples of FIGS. 6A, 6B, and 6C, the ternary branch instruction word takes the form:

BRANCH($L_{FIXED}$, $L_Z$)

or simply

BR3($L_{FIXED}$, $L_Z$).

As shown in FIG. 6A, the system, in step 610a, tests the conditions to determine a jump location. In other words, the system, in step 610a, evaluates these conditions and selects one of three branch target addresses depending on the result of the evaluation. Again, the assumption is that there are three branch conditions, condition-X, condition-Y, and condition-Z, and three branch target addresses, X, Y, and Z, each having an instruction set, X', Y', and Z', respectively. Depending on which of the three branch conditions are satisfied, a jump is made to one of the three branch target addresses. Since, in these examples, an absolute branch target address is not provided, the system must first determine these values from $L_{FIXED}$ and $L_Z$. Having set forth, in FIGS. 3A through 5C, the method for calculating absolute branch target addresses from address indicators, it will be clear to one of ordinary skill in the art how this may be accomplished using the fixed variables $L_{FIXED}$ and $L_Z$, as shown in FIG. 6A.

As discussed in relation to FIG. 1A, the three branch conditions are usually A<B (condition-X), A>B (condition-Y), and A=B (condition-Z). Thus, the test conditions are usually two inequality conditions and one equality condition. For these types of situations, the lengths of the instruction sets for the two inequality-conditions (i.e., A<B and A>B) are similar while the length of the instruction set for the equality condition (i.e., A=B) is different. Hence, under these test conditions, it is better to encode X' and Y' as equal lengths, and Z' as a different length.

Figure 7A:
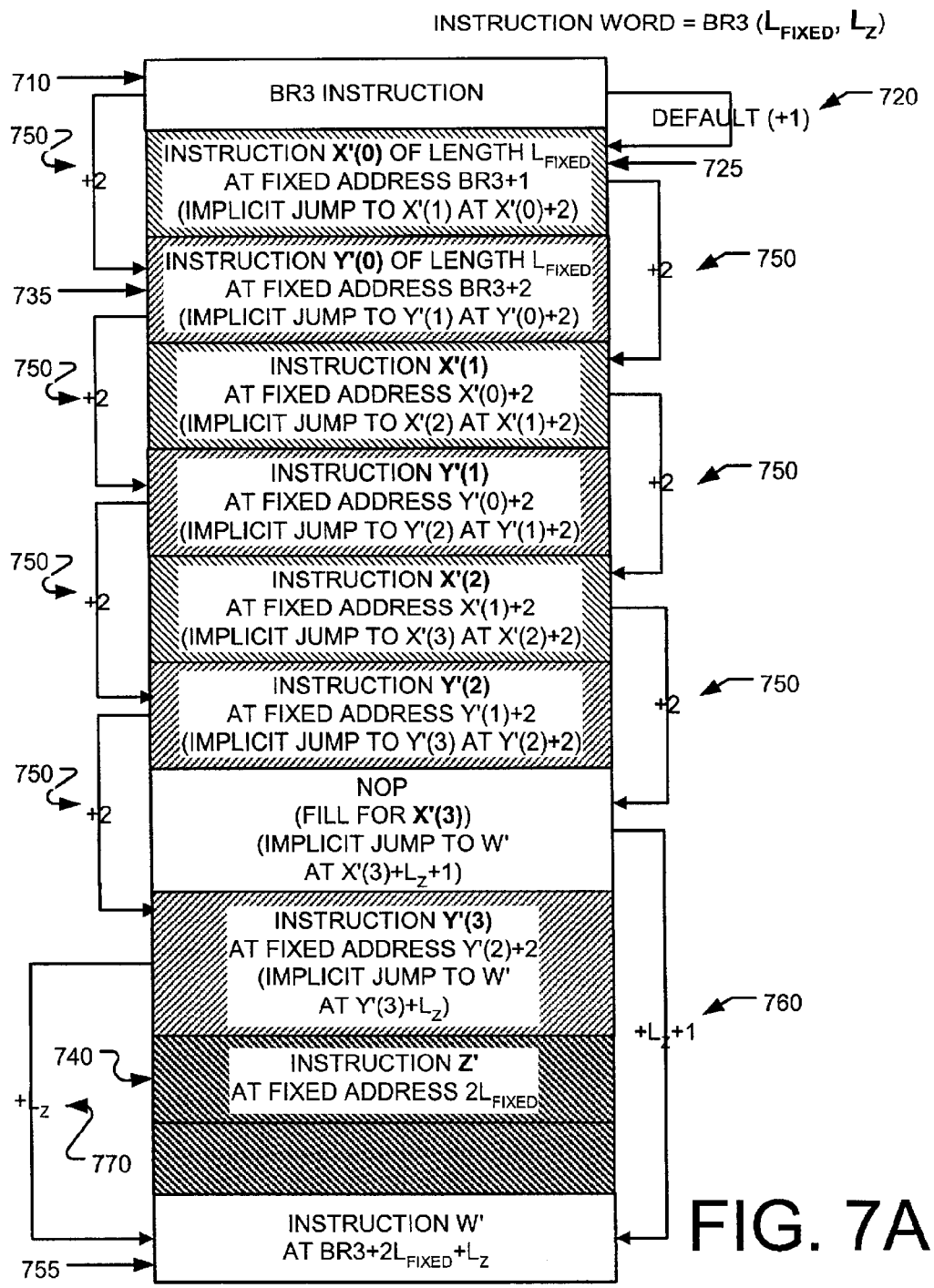
FIG. 7A is a block diagram illustrating a processor memory having two of the instruction sets interleaved in memory and a third instruction set located immediately after the interleaved instruction sets.

FIGS. 7A and 7B provide additional optimizations in performance that may be achieved for processors that implement instruction prefetch buffers, where the prefetch speed exceeds the instruction dispatch speed (i.e., some processors that use instruction caches). Additional hardware implications are explained below with reference to the code, which implements the optimization of FIG. 7A.

FIG. 7A is a block diagram illustrating a processor memory having the branch instructions for the two inequality conditions interleaved in processor memory. As shown here, X 725 is adjacent to BR3 710, Y 735 is offset 2 from BR3 710, and X' and Y' are interleaved in memory at alternating address locations. Z follows the interleaved instruction sets (i.e., X' and Y') and contains the beginning of Z', and W follows Z' and contains the beginning of W'. By allowing this type of interleaved configuration, the system avoids pipeline stalls that are normally present if the next instruction to dispatch is not in the prefetch buffer. Additionally, the instruction pointer implementation is simplified by the configuration of FIG. 7. This is more clearly shown using the example code:

```
01  if NormalState {
02      if TernaryBranchInstruction {
03          if ConditionX {
04              PC = PC + 1;
05              InstructionCounter = Lfixed;
06          } elsif ConditionY {
07              PC = PC + 2;
08              InstructionCounter = Lfixed;
09          } else {
10              PC = PC + Lfixed<<1;
11              InstructionCounter = Lz;
12          }
13          ImplicitJumpAddressRegister = Lfixed<<1 + Lz;
14          goto TernaryBranchState
15      } else {
16          PC = PC + 1;
17          goto NormalState;
18      }
19  } elsif TernaryBranchState {
20      InstructionCounter = InstructionCounter - 1;
21
22      if (InstructionCounter = 0) {
23          PC = ImplicitJumpAddressRegister;
24          goto NormalState;
25      } else {
26          PC = PC + 2;
27          goto TernaryBranchState;
28  }
```

As shown through this example, assuming that all instructions are the same length, only +1 and +2 of the program counter (PC) are required to implement the interleaved instruction sets of FIG. 7A. This simplifies the hardware implementation because there is no longer a need to calculate absolute addresses from the provided address indicators. In other words, unlike the examples of FIGS. 1A through 6C, the addresses here are implicitly defined by hard-coded increments (i.e., +1 and +2) of the program counter.

FIG. 7B shows a specific non-limiting example of the implementation of FIG. 7A. As shown in this specific example, BR3 is located at an address of 1000000; X', which is 4 instructions in length (i.e., 3 instructions +1 NOP), is interleaved in memory at locations 1000001, 1000003, 1000005, and 1000007; Y', which is also 4 instructions in length, is interleaved in memory at locations 1000002, 1000004, 1000006, and 1000008; Z', which is two instructions in length, is located after the interleaved instruction sets, X' and Y', at 1000009; and W' is located after Z' at 1000011.

Figure 8A:
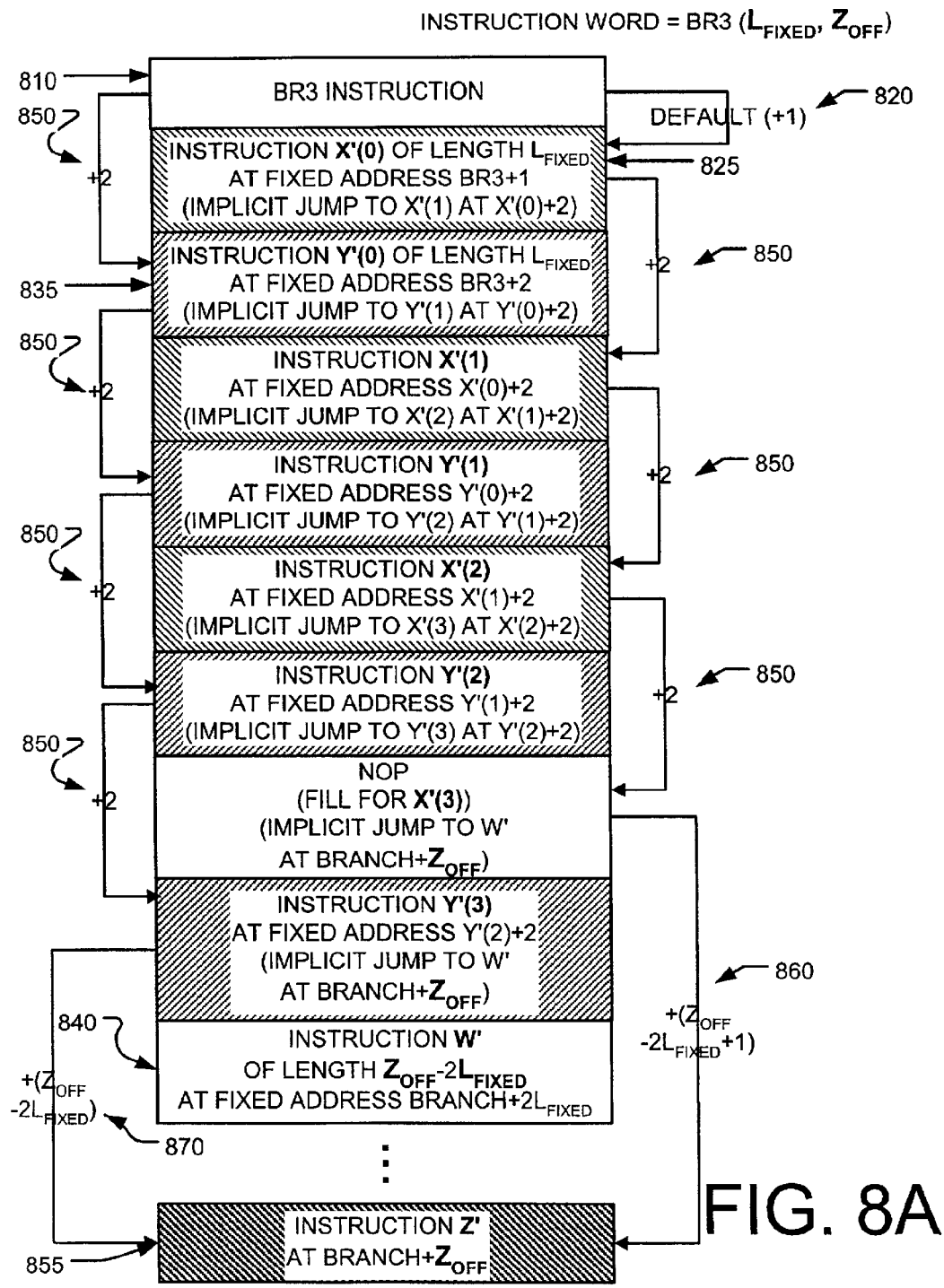
FIG. 8A is a block diagram illustrating a processor memory having two of the instruction sets interleaved in memory and a third instruction set located at a fixed offset from an instruction-word address location.

FIGS. 8A and 8B provide one more alternative to the embodiment of FIGS. 7A and 7B. Since the recombine instruction set is usually a termination condition, the size of the recombine instruction set may be very small (i.e., W' may be a short instruction set). In cases such as this, rather than having Z' immediately after the interleaved portion (as in FIGS. 7A and 7B), encoding Z' (or some indicator of Z) as a fixed offset from BR3 would allow the exit code, W', to immediately follow the interleaved instruction sets for the inequality conditions.

Figure 9:
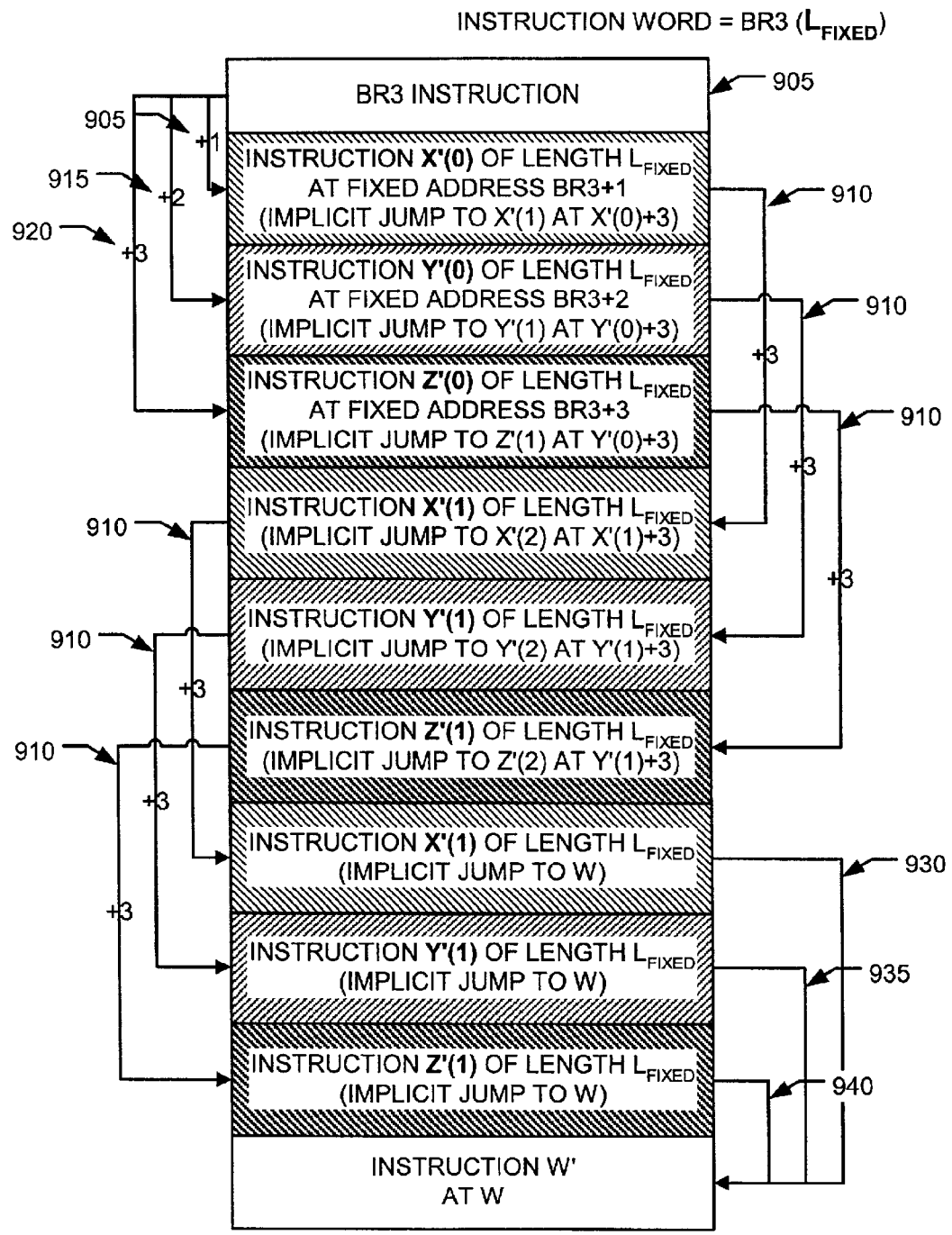
FIG. 9 is a non-limiting example showing all three instruction sets interleaved in memory.

FIG. 9 shows an implementation of the invention, wherein all three branch instructions are interleaved in memory. In essence, this implementation allows for a very short ternary branch instruction word while allowing for simplified hardware implementation since the addresses are implicitly defined by hard-coded increments (i.e., +1, +2, and +3). Here, the ternary branch instruction word would take the form $$BRANCH(L_{FIXED})$$

or $$BR3(L_{FIXED}),$$

and the location of W' would be calculated as $3 \times L_{FIXED}$. Thus, the hardware configuration would comprise logic configured to calculate W as a function of $L_{FIXED}$. In this regard, the hardware configuration for the implementation in FIG. 9 would be similar to the hardware implementation of FIG. 5A, with one difference being that, since the instruction sets are interleaved, the instruction sets may be accessed by implicit jumps rather than having to calculate the location of each instruction set.

Figure 10A:
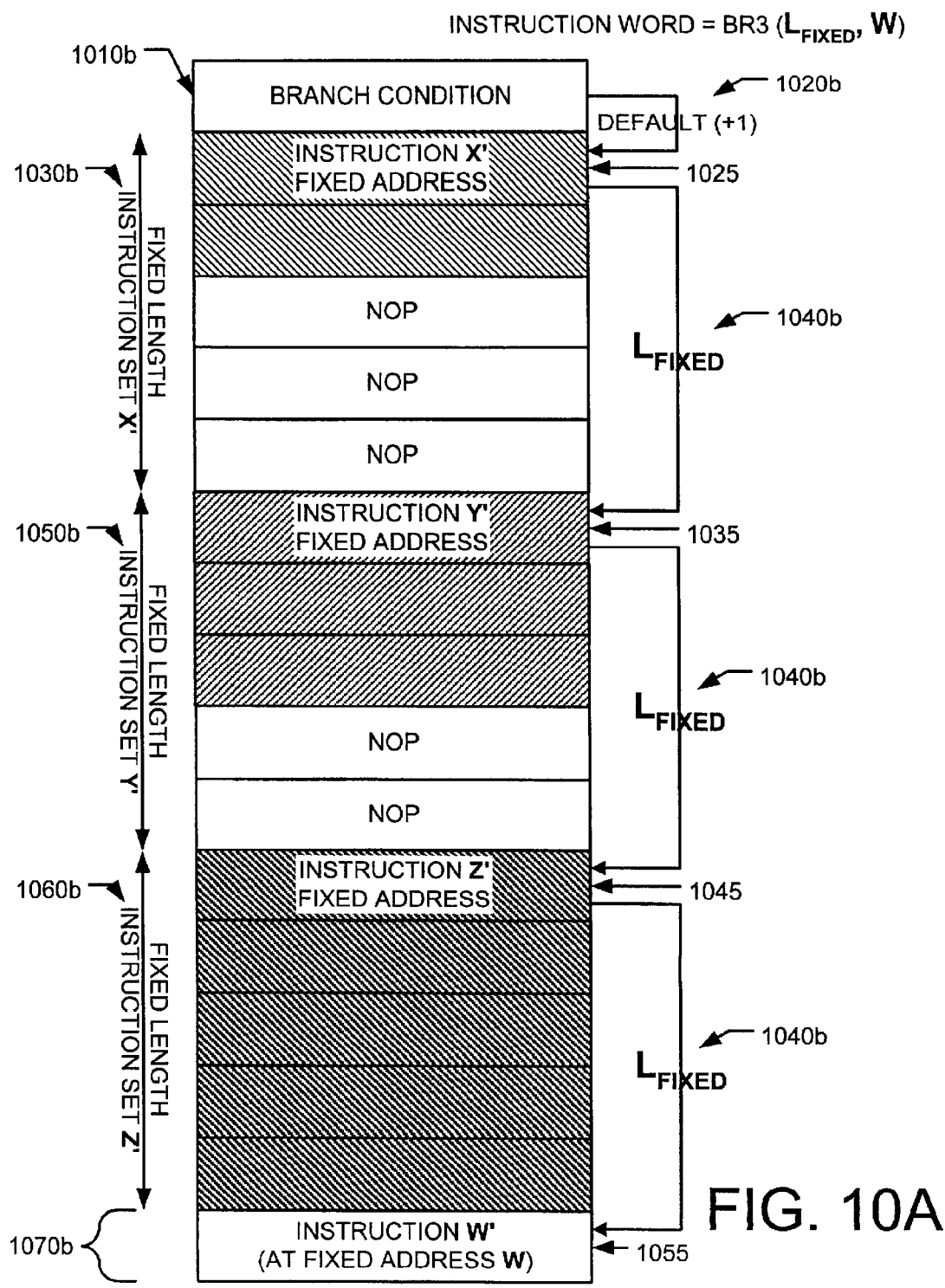
FIG. 10A is a non-limiting example showing the preferred embodiment of the invention, wherein the size of the instruction word and the hardware requirements of the system are optimized.

FIGS. 10A and 10B are diagrams illustrating a preferred embodiment of the invention, wherein the instruction length and hardware complexity are balanced so as to achieve optimum efficiency. Similar to the example of FIGS. 5A through 5C, each of the instruction sets X', Y', and Z' are fixed to $L_{FIXED}$, and the recombine address W is encoded in the ternary branch instruction word. This allows the system to be configured without an adder to determine the instruction count or the value of the ImplicitJumpAddressRegister (since this is encoded in the instruction word). Additionally, if the processor includes branch instructions with relative offsets, the adder performing the PC additions already exists in the system. Thus, for such an implementation, the system comprises only additional logic configured to implement $L_{FIXED}$ and $L_{FIXED}<<1$, as shown in the code:

```
01   if NormalState {
02       if TernaryBranchInstruction {
03           if ConditionX {
04               PC = PC + 1;
05           } elsif ConditionY {
06               PC = PC + Lfixed;
07           } else {
08               PC = PC + Lfixed<<1;
09           }
10           InstructionCounter = Lfixed;
11           ImplicitJumpAddressRegister = W;
12           goto TernaryBranchState
```

```
13       } else {
14           PC = PC + 1;
15           goto NormalState;
16       }
17   } elsif TernaryBranchState {
18       InstructionCounter = InstructionCounter - 1;
19
20       if (InstructionCounter = 0) {
21           PC = ImplicitJumpAddressRegister;
22           goto NormalState;
23       } else {
24           PC = PC + 1;
25           goto TernaryBranchState;
26   }
```

Figure 10C:
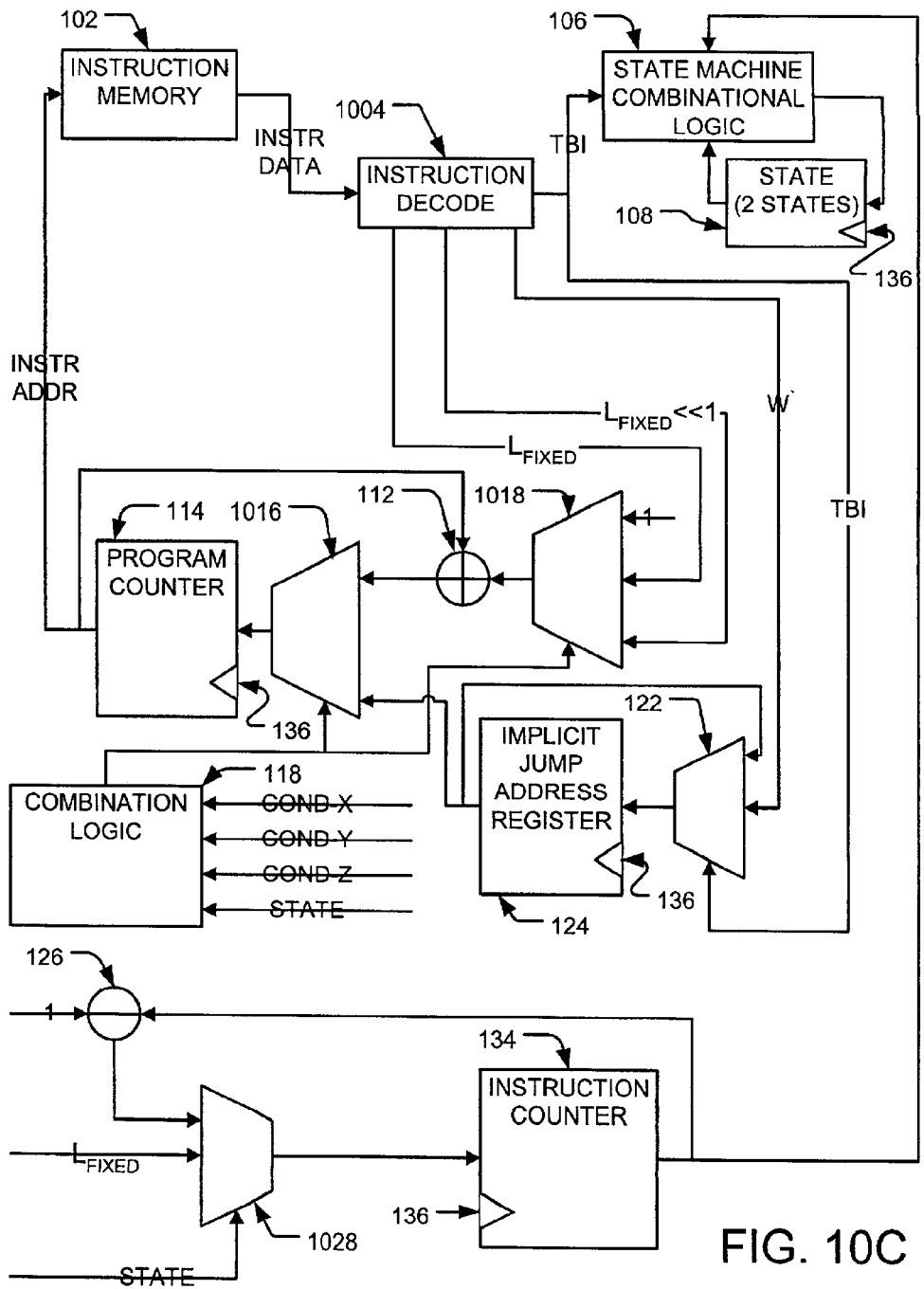
FIG. 10C is a non-limiting example of a hardware configuration that may be used to implement the preferred embodiment.
Figure 11:
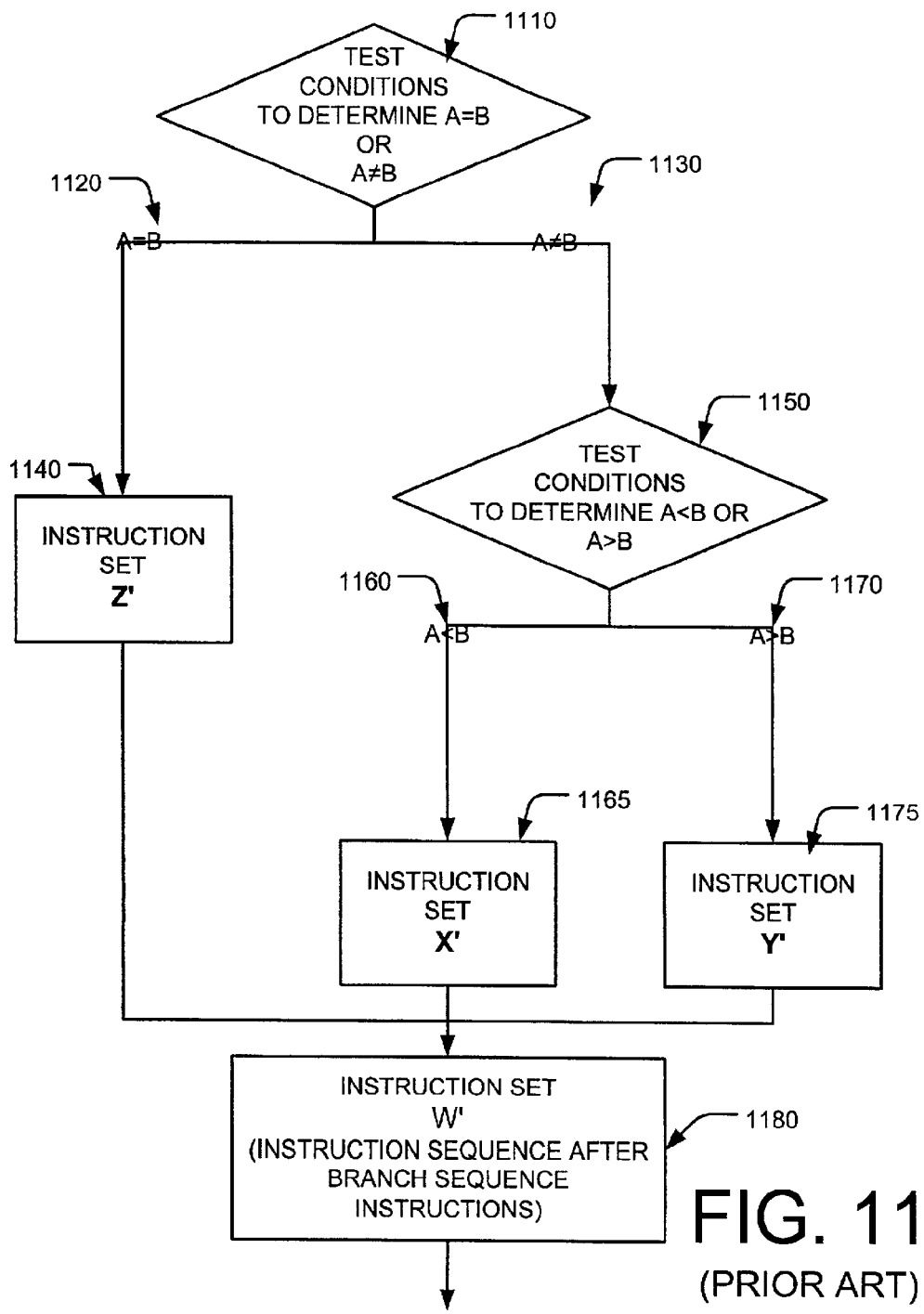
FIG. 11 is a diagram illustrating a search as performed in the prior art by cascading two tests.

Specifically, FIG. 10C shows one possible hardware configuration for implementing the code of FIGS. 10A and 10B. Comparing FIG. 10C with FIG. 1D, one can see that the hardware configuration is greatly simplified. Unlike FIG. 1D, which comprised a 5× MUX 116 (FIG. 1D), here, the program counter 114 receives its input from a 2× MUX 1016, which has, as its inputs, either PC+1, PC+$L_{FIXED}$, or PC+$L_{FIXED}$<<1, as determined by a 3× MUX 1018, and the address of W' from ImplicitJumpAddressRegister 136. Additionally, the hardware is simplified because the two 4× MUXs 128, 132 of FIG. 1D are replaced by a single 2× MUX 1028.

Although an exemplary embodiment of the present invention has been shown and described, it will be apparent to those of ordinary skill in the art that a number of changes, modifications, or alterations to the invention as described may be made, none of which depart from the spirit of the present invention. For example, several of these embodiments may be combined in different ways to further optimize performance. Also, while condition-X, condition-Y, and condition-Z have been assigned for A<B, A>B, and A=B, in a general sense, these conditions need not be equality or inequality operators, but may be any other type of operator or function that is executable by a processor. Furthermore, while many of the combinations of the above-mentioned implementations have been explicitly described, it will be clear to one of ordinary skill in the art that all such permutations and combinations have not been exhaustively described herein, and that the permutations and combinations which are implicated by the explicitly-described embodiments are intended to be within the scope of the invention. Moreover, while only two implementations (FIG. 1D and FIG. 10C, which represent one example of a complex hardware implementation and a simplified hardware implementation, respectively) are shown, it will be clear to one of ordinary skill in the art that various hardware components may be added or removed from FIGS. 10C and 1D to achieve the functionality of the embodiments of FIGS. 2 through 9. All such changes, modifications, and alterations should therefore be seen as within the scope of the present invention.

We claim:

1. A system for performing ternary branch instructions, comprising:

an instruction word associated with branch conditions;

a first branch target address encoded in the instruction word, the first branch target address having a first branch instruction set;

a second branch target address encoded in the instruction word, the second branch target address having a second branch instruction set;

a third branch target address encoded in the instruction word, the third branch target address having a third branch instruction set;

a recombine target address encoded in the instruction word, the recombine target address having a recombine instruction set; and a processor configured to receive the instruction word, the processor further configured to evaluate the branch conditions associated with the instruction word and process a branch jump instruction, the processor further configured to select one of the branch target addresses in response to the branch jump condition, the processor further configured to jump to the selected branch target address and execute the branch instruction set at the selected branch target address, the processor further configured to implicitly jump to a recombine target address and execute the recombine instruction set after executing the selected branch instruction set.

2. A method for performing ternary branch instructions, comprising the steps of:

receiving an instruction word having three encoded branch target addresses and a recombine target address, the instruction word located at an instruction-word address location, each target address having an instruction set;

evaluating branch conditions;

selecting one of the three branch target addresses in response to the step of evaluating the branch conditions;

executing the instruction set at the selected branch target address; and executing the instruction set at the recombine target address after executing the instruction at the selected branch target address.

3. The method of claim 2, wherein the step of selecting one of the three branch addresses further comprises the steps of:

receiving at least one target address indicator; and determining an absolute branch target address from the received at least one target address indicator.

4. The method of claim 3, wherein the at least one target address indicator is one of a plurality of relative branch target offsets indicating a difference between the instruction-word address location and an absolute branch target address location.

5. The method of claim 4, wherein the step of determining the absolute branch target address further comprises the steps of:

selecting one of the plurality of relative branch target offsets; and adding the selected one of the plurality of relative branch target offsets to the instruction-word address location.

6. The method of claim 3, wherein the at least one target address indicator is a size of one of a plurality of instruction sets.

7. The method of claim 6, wherein the step of determining the absolute branch target address further comprises a step of adding the size of one of the plurality of instruction sets to the instruction-word address location.

8. The method of claim 3, wherein the target address indicator is a default location.

9. A system for performing ternary branch instructions, comprising:

means for receiving an instruction word having three encoded branch target addresses and a recombine target address, the instruction word located at an instruction-word address location, each target address having an instruction set;

means for evaluating branch conditions;

means for selecting one of the three branch target addresses in response to the step of evaluating the branch conditions;

means for executing the instruction set at the selected branch target address; and means for executing the instruction set at the recombine target address after executing the instruction at the selected branch target address.

10. The system of claim 9, wherein the means for selecting one of the three branch addresses further comprises:

means for receiving at least one target address indicator; and means for determining an absolute branch target address from the received at least one target address indicator.

11. The system of claim 10, wherein the at least one target address indicator is one of a plurality of relative branch target offsets indicating a difference between the instruction-word address location and an absolute branch target address location.

12. The system of claim 11, wherein the means for determining the absolute branch target address further comprises:

means for selecting one of the plurality of relative branch target offsets; and means for adding the selected one of the plurality of relative branch target offsets to the instruction-word address location.

13. The system of claim 10, wherein the at least one target address indicator is a size of one of a plurality of instruction sets.

14. The system of claim 13, wherein the means for determining the absolute branch target address further comprises means for adding the size of one of the plurality of instruction sets to the instruction-word address location.

15. The system of claim 10, wherein the target address indicator is a default location.

* * * * *